United States Patent
Smith

(10) Patent No.: US 12,130,956 B2
(45) Date of Patent: Oct. 29, 2024

(54) HUMAN VERIFICATION WITH A CAPACITANCE MODULE

(71) Applicant: Cirque Corporation, Sandy, UT (US)

(72) Inventor: Tyler Smith, American Fork, UT (US)

(73) Assignee: Cirque Corporation, Sandy, UT (US)

( * ) Notice: Subject to any disclaimer, the term of this patent is extended or adjusted under 35 U.S.C. 154(b) by 220 days.

(21) Appl. No.: 17/823,160

(22) Filed: Aug. 30, 2022

(65) Prior Publication Data

US 2024/0069624 A1   Feb. 29, 2024

(51) Int. Cl.
*G06F 3/03* (2006.01)
*G06F 3/01* (2006.01)

(52) U.S. Cl.
CPC ............ *G06F 3/011* (2013.01); *G06F 3/016* (2013.01); *G06F 3/03* (2013.01)

(58) Field of Classification Search
CPC .......... G06F 3/011; G06F 3/016; G06F 3/03; G06F 3/03547; G06F 1/169; G06F 21/316; G06F 2221/2133
See application file for complete search history.

(56) References Cited

U.S. PATENT DOCUMENTS

| | | | |
|---|---|---|---|
| 7,945,952 B1 | 5/2011 | Behforooz | |
| 10,243,927 B2 | 3/2019 | Holloway | |
| 10,298,569 B2 | 5/2019 | Shuster | |
| 10,877,560 B2 | 12/2020 | Friedman | |
| 2015/0301724 A1* | 10/2015 | Thibadeau, Sr. | ... G06F 3/04847 715/765 |
| 2015/0319153 A1* | 11/2015 | Tartz | ........ G06F 21/36 726/4 |
| 2017/0366564 A1* | 12/2017 | Ping | .......... H04L 63/20 |
| 2018/0197433 A1* | 7/2018 | Tavares | ................ G09B 21/007 |
| 2020/0342879 A1 | 10/2020 | Carbune | |
| 2022/0147609 A1* | 5/2022 | Kim | ......... G06T 13/80 |

FOREIGN PATENT DOCUMENTS

WO   WO-2021196680 A1 * 10/2021   ............. G06F 3/016

* cited by examiner

*Primary Examiner* — Stephen G Sherman

(57) ABSTRACT

Telling a human apart from a computer using a capacitance module may include receiving a request for human verification; determining a human-verification prompt; communicating the human-verification prompt using a prompting device in the capacitance module; detecting a response to the human-verification prompt using a user input sensor in the capacitance module; determining whether a human is operating the capacitance module based, in part, on the response detected with the user input detector; and returning a human verification result.

20 Claims, 20 Drawing Sheets

HUMAN VERIFICATION WITH A CAPACITANCE MODULE

FIELD OF THE DISCLOSURE

This disclosure relates generally to systems and methods for telling humans apart from computers and computer programs. In particular, this disclosure relates to systems and methods for telling humans apart from computers using capacitance modules.

BACKGROUND

Human verification, or the process of telling a human apart from a computer, is a problem that has had many solutions. Telling a human apart from a computer is an essential process in protecting certain files, webpages, and computer functions that may be sensitive. A Turing test is a test of a machines ability to exhibit intelligent behavior similar to, or indistinguishable from, that of a human. In many computer programs, a Completely Automated Public Turing Test to tell Computers and Humans Apart (CAPTCHA) is used to verify that a user is human before granting user access to files, webpages, or computer functions. Such tests ensure that certain files, webpages, and computer functions are protected from being accessed by computers or internet bots. As computers become more advanced, the ability of a computer to solve a CAPTCHA improves, and CAPTCHAs become more complicated and intricate to remain effective at telling humans apart from computers.

An example of a CAPTCHA is disclosed in U.S. Pat. No. 7,945,952 issued to Reza Behforooz. This reference discloses methods and apparatuses for presenting challenges to tell humans and computers apart. In one embodiment, automated determination of whether a human or machine is at the other end of a communication channel is based on whether the correct response to a challenge/question is received from the other end of the communication channel. The challenge is provided in a non-image format, such as text-based questions or a sound clip, to prevent abuses of the communication system by computer software robots. The communication system may be primarily for text and/or voice communications or be such that the rendering image-based challenges can cause significant disruption in normal flow of usage. In one example, the challenge includes deliberately generated random misspelling. In one example, the challenge is context sensitive, factual based, and/or instructive of an operation in a natural language to obtain a result.

Another example of a CAPTCHA is disclosed in U.S. Pat. No. 10,298,569 issued to Gary Stephen Shuster. This reference discloses systems and methods for verifying human users through cognitive processes that computers cannot imitate. Human cognitive language processing techniques may be used to verify human users. Visual patterns and tests may be used to distinguish between humans and computer because computer-based visual recognition is fundamentally different from human visual processing. Persistent plugins and tests may be used to continuously verify human users.

Another example of a CAPTCHA is disclosed in WO Patent No. 2020032919A1 issued to Victor Carbune, et al. This reference discloses implementing and applying an adaptive and self-training CAPTCHA ("Completely Automated Public Turing test to tell Computers and Human Apart") assistant that distinguishes between a computer-generated communication (e.g., speech and/or typed) and communication that originate from a human. The CAPT-CHA assistant utilizes a generative adversarial network that is self-training and includes a generator to generate synthetic answers and a discriminator to distinguish between human answers and synthetic answers. The trained discriminator is applied to potentially malicious remote entities, which are provided challenge phrases. Answers from the remote entities are provided to the discriminator to predict whether the answer originated from a human or was computer-generated.

Some human verification processes rely on hardware prompts. Such processes may present a user with a vibration or other tactile feedback imperceptible to a computer. A human user responds to the prompt to verify that they are a human and not a computer. These solutions rely on a mix of hardware and software to verify human users, and their use cases are more specific than the use cases where CAPTCHAs are implemented.

An example of a human verification process relying on a hardware prompt is disclosed in U.S. Pat. No. 10,877,560 issued to Michael Jason Friedman, et al. The reference discloses haptic feedback for authentication and security in computer systems. An indication is obtained of interaction of a putative human user with a computing device. Responsive to the indication, presentation of a haptic pattern to the putative human user is facilitated; the pattern is not amenable to machine perception. Prompting of the putative human user to input information indicative of human perception of the pattern is facilitated. Information input by the putative human user is obtained responsive to the prompting. When the information input by the putative human user indicates that the putative human user is an actual human user, the interaction is permitted to continue. Haptic techniques are also provided for access control and/or to defend against malevolent web sites which masquerade as legitimate web sites.

Yet another solution to human verification is cryptography. Using a cryptographic process, a request for human verification can be sent securely to an external server. The external server analyzes human verification requests to determine whether a human is operating the device that sent the verification request. Cryptographic solutions rely on software and external servers for human verification.

An example of a cryptographic human verification process is disclosed in U.S. Pat. No. 102,243,927 issued to Lee Hahn Holloway, et al. This reference discloses method and apparatuses for providing internet-based proxy services. A proxy server receives, from multiple visitors of multiple client devices, a plurality of requests for actions to be performed on identified network resources belonging to a plurality of origin servers. At least some of the origin servers belong to different domains and are owned by different entities. The proxy server and the origin servers are also owned by different entities. The proxy server analyzes each request it receives to determine whether that request poses a threat and whether the visitor belonging to the request poses a threat. The proxy server blocks those requests from visitors that pose a threat or in which the request itself poses a threat. The proxy server transmits the requests that are not a threat and is from a visitor that is not a threat to the appropriate origin server.

Each of these references are herein incorporated by reference for all that they disclose.

SUMMARY

In one embodiment, a module may include a prompting device; a processor in communication with the prompting device; the processor being embedded into the module and dedicated to operating the module; memory, in communication with the processor, containing programmed instructions that cause the module, when activated, to determine a human-verification prompt and communicate the human-verification prompt using the prompting device.

The module may be in communication with a central processing unit programmed to execute non-capacitance module operations, the human-verification prompt being imperceptible to the central processing unit.

The processor may further include a request bus and a response bus, and the programmed instructions may cause the processor, when activated, to receive a human-verification request from the central processing unit over the request bus and send a human-verification result to the central processing unit over the response bus.

The central processing unit may be programmed to execute non-capacitance module operations and the human-verification prompt may not be communicated to the central processing unit.

The module may include a user input detector, and the programmed instructions may cause the module, when activated, to detect a response to the human-verification prompt using the user input detector.

The programmed instructions may cause the module, when activated, to determine whether a human is operating the capacitance module based, in part, on the response detected by the user input detector.

Determining whether a human is operating the capacitance module may include detecting a parameter indicated by the human-verification prompt.

The parameter may be a number of taps, a duration hold, a user input location, an intensity, or combinations thereof.

The user input detector may be a capacitive sensor.

The user input detector may be a pressure sensor.

The prompting device may include a haptic motor.

The human-verification prompt may be communicated by the haptic motor by generating a vibration.

The prompting device may include a light source.

The human-verification prompt may be communicated by the light source by generating a light output.

The human-verification prompt may be selected from a number of pre-programmed prompts.

The human-verification prompt may be generated by the processor.

In another embodiment, a method for telling a human apart from a computer using a capacitance module may include: receiving a request for human verification; determining a human-verification prompt; communicating the human-verification prompt using a prompting device in the capacitance module; detecting a response to the human-verification prompt using a user input sensor in the capacitance module; determining whether a human is operating the capacitance module based, in part, on the response detected with the user input detector; and returning a human verification result.

The request for human verification may be sent to the capacitance module by an external processor and the human verification result may be returned to the external processor.

Determining whether a human is operating the capacitance module may include detecting a parameter indicated by the human-verification prompt.

In another embodiment, a computer-program product for telling a human apart from a computer using a capacitance module may include a non-transitory computer-readable medium storing instructions executable by a processor to: receive a request for human verification; determine a human-verification prompt; communicate the human-verification prompt using a prompting device in the capacitance module; detect a response to the human-verification prompt using a user input sensor in the capacitance module; determine whether a human is operating the capacitance module based, in part, on the response detected by the user input detector; and return a human verification result.

Figure 1:
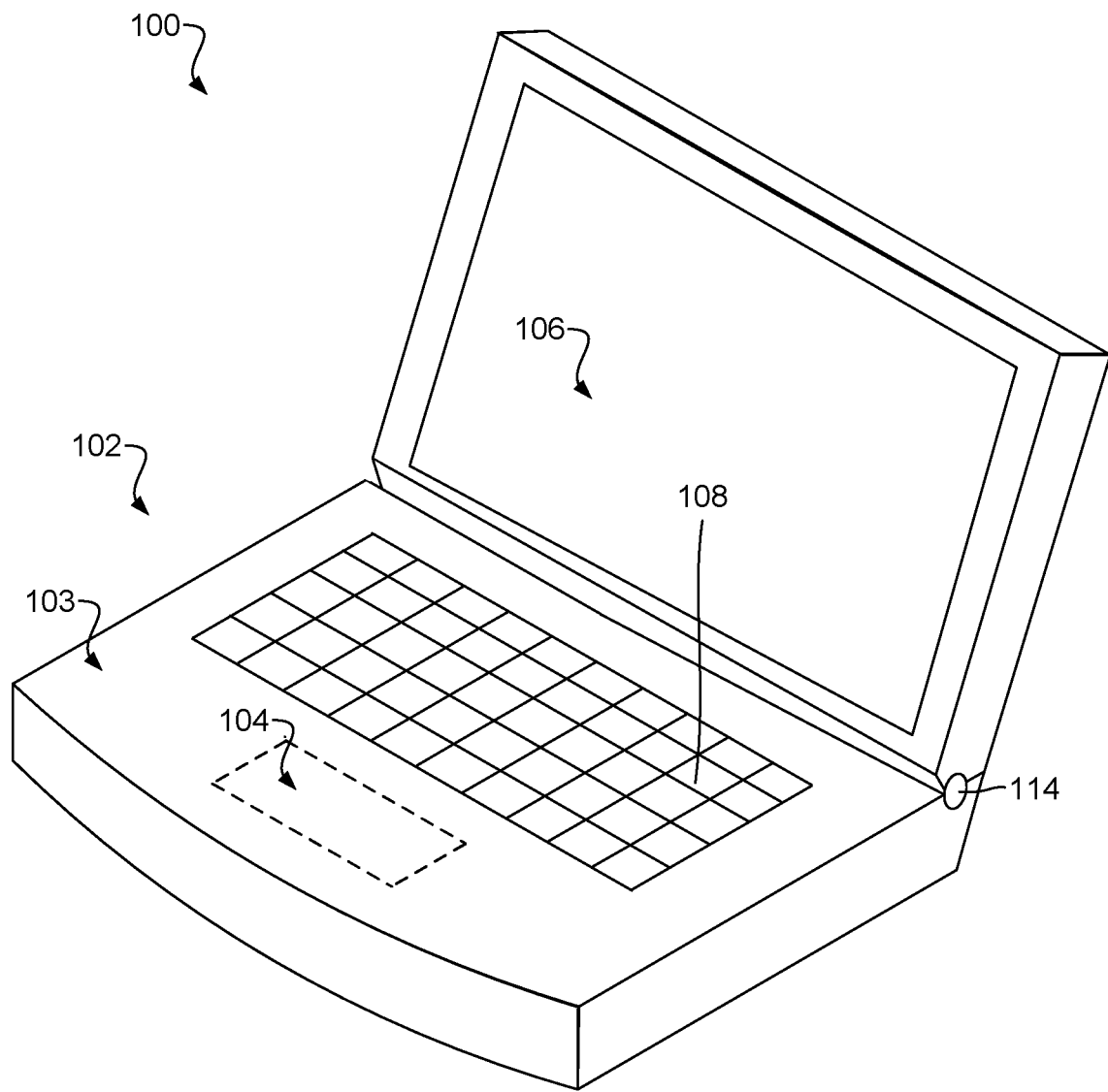
FIG. 1 depicts an example of a electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "prompt" may generally refer to a human perceptible phenomenon generated by a computer device. A prompt may be communicated in several ways depending on the capabilities of the computer device generating the prompt. For example, in cases where a computer device includes a light source, the computer device may generate a visual prompt by activating the light source. In another example where a computer device includes a speaker, the computer device may generate an audio prompt by playing a sound with the speaker. A prompt may be a visual prompt, audio prompt, vibrational prompt, another type of prompt, or combinations thereof.

A prompt may be generated by a computer device in order to communicate information to a user. For example, an audio prompt may communicate that a message has been received. In another example, a visual prompt may communicate that certain functions of the computer device are in use. In yet another example, a vibrational prompt may communicate a hardware problem in the computer device. The information communicated by a prompt may vary in different contexts. For example, in one context, a visual prompt may communicate that a message has been received, while in another context, the visual prompt may communicate that the battery life of the computer device is low.

For the purposes of this disclosure, the term "human-verification" may generally refer to telling a human apart from a computer. Some files and functions of a computer device may be protected by a human-verification process to ensure that the protected files and functions can only be accessed by a human user. Human-verification processes may prevent computers and computer-bots from accessing protected files and functions. A human-verification process may prompt the user using visual, vibrational, haptic, audio, or other types of information.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
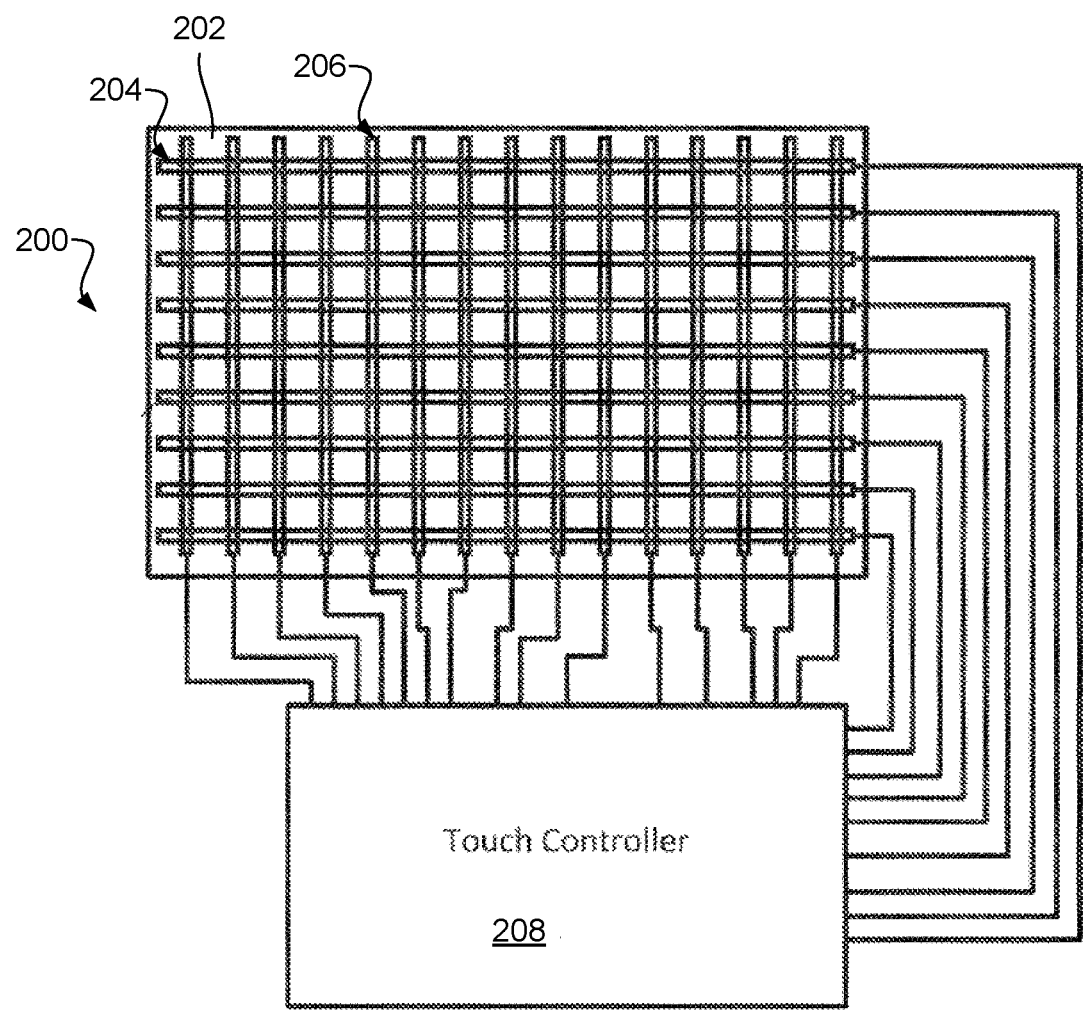
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
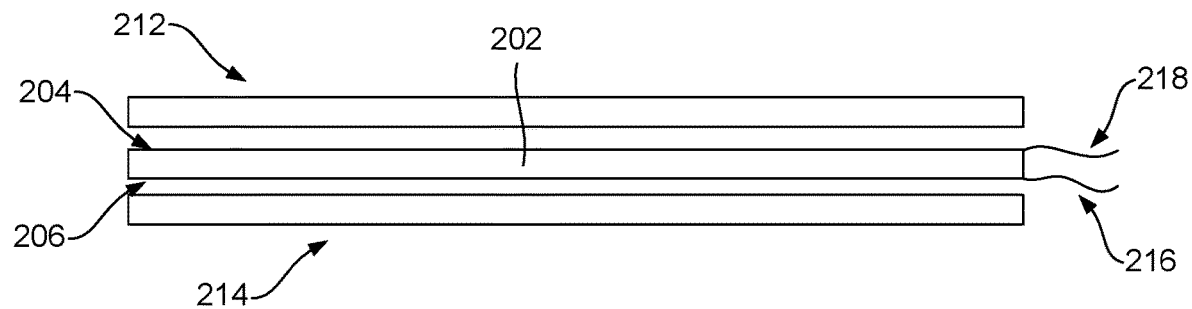
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
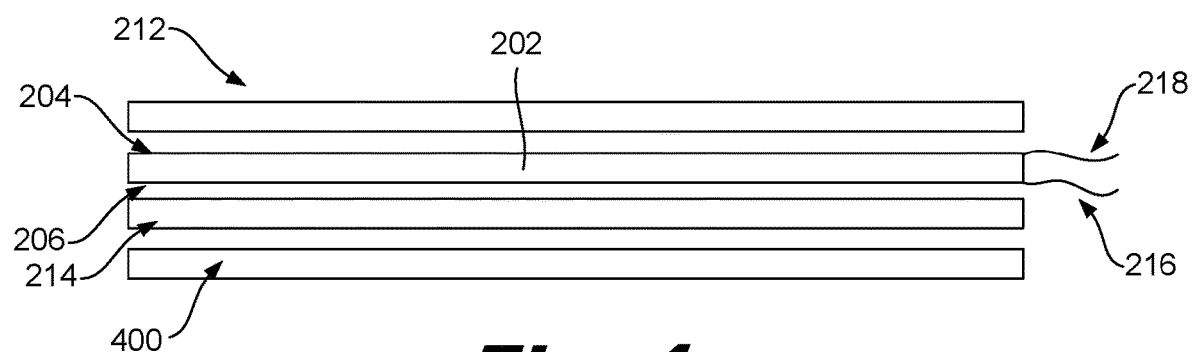
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
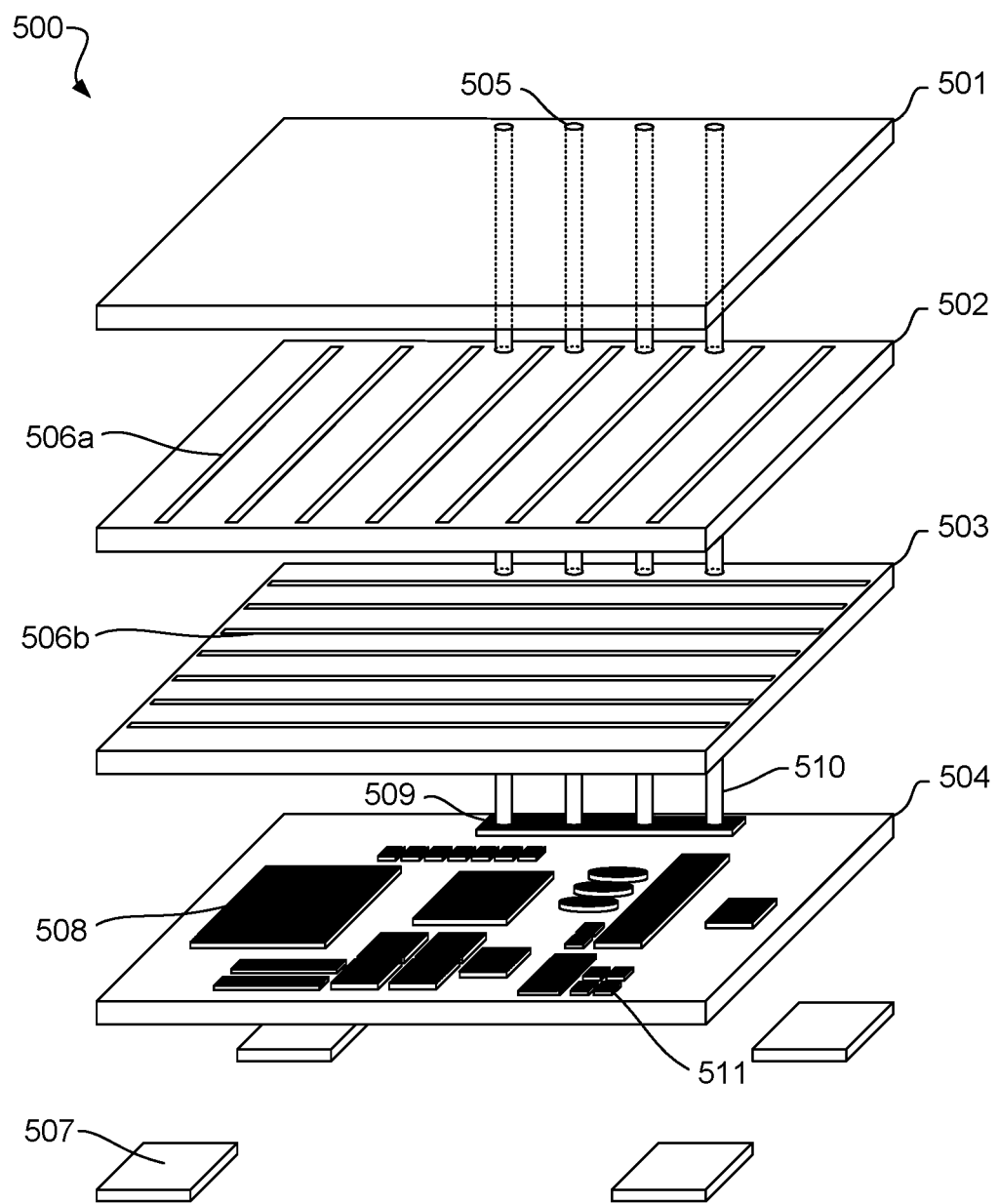
FIG. 5 depicts an example of a capacitance module in accordance with the disclosure.

FIG. 5 depicts an example of a capacitance module 500 in accordance with the disclosure. For illustrative purposes, the capacitance module 500 is depicted with an exploded view. The capacitance module 500 includes a capacitance reference surface 501, a first electrode layer 502, a second electrode layer 503, and a component layer 504. Additionally, four haptic motors 507 are located adjacent to the component layer 504.

The capacitance reference surface 501 may be made of plastic, glass, another material, or combinations thereof. A user may interact with the capacitance module 500 by touching the capacitance reference surface 501 with a finger, stylus, or some other capacitance input device. In some examples, a capacitance module may be able to detect proximity. Such a capacitance module may be tuned such that a user may interact with the capacitance reference surface without physically touching it.

The capacitance reference surface 501 may include four light holes 505 as depicted in the example of FIG. 5. The light holes are connected to light pipes 510 that are routed to an LED array 509 on the component layer. The LED array 509 may illuminate the light holes 505 via the light pipes 510.

While in this example the capacitance reference surface 501 includes four light holes 505 arranged linearly, in other examples, light holes in a capacitance reference surface may be arranged differently. For example, a capacitance reference surface may include five light holes, six light holes, or a different number of light holes. In other examples, a capacitance reference surface may include light holes in linear patterns, radial patterns, other patterns, or combinations thereof.

The first electrode layer 502 is adjacent to the capacitance reference surface 501. The first electrode layer 501 contains a first set 506a of electrodes. The electrodes in the first set 506a may be transmit electrodes, sense electrodes, another type of electrodes, or combinations thereof. The electrodes in the first set 506a may be made out of copper, gold, another conducting material, or combinations thereof.

The second electrode layer 503 is adjacent to the first electrode layer 502. The second electrode layer 502 contains a second set 506b of electrodes. The electrodes in the second set 506b may be transmit electrodes, sense electrodes, another type of electrodes, or combinations thereof. The electrodes in the second set 506b may be made out of copper gold, another conducting material, or combinations thereof.

The first set 506a of electrodes on the first electrode layer 502 may be arranged transverse from the second set 506b of electrodes on the second electrode layer 503. Together, the first electrode layer 502 and second electrode layer 503 form a mutual capacitance sensor.

While the mutual capacitance sensor in this example is formed by two electrode layers: the first electrode layer 502 and the second electrode layer 503, in other examples, a mutual capacitance sensor may be formed by a different number of layers. For example, a mutual capacitance sensor may be formed by one layer, two layers, three layers, a different number of layers, or combinations thereof.

While the electrodes of the first set 506a are arranged transverse from the electrodes of the second set 506b, in other examples, the electrodes in a mutual capacitance sensor may be arranged differently. For example, the electrodes in a mutual capacitance sensor may be arranged in linear strings, as radial patterns, in another type of pattern, or combinations thereof.

While in this example the capacitance module 500 incorporates a mutual capacitance sensor formed by the first electrode layer 502 and second electrode layer 503, in other examples, a capacitance module may incorporate a self-capacitance sensor. In examples where a capacitance module incorporates a self-capacitance sensor, the capacitance module may include fewer electrode layers than examples where a capacitance module incorporates a mutual capacitance sensor. For example, a capacitance module that incorporates a self-capacitance sensor may include only one electrode layer with a single set of electrodes.

The component layer 504 is adjacent to the second electrode layer 503. The component layer 504 may include a printed circuit board (PCB). The component layer includes components 511 dedicated to the operation of the capacitance module 500. These components may include, but are not limited to, a digital signal processor (DSP), an analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

In the example of FIG. 5, the component layer 504 includes an LED array 509. The LED array 509 may include light emitting diodes of various colors which may be illuminated with programmable intensities. When activated, LEDs within the LED array 509 may illuminate. The LED array 509 is connected to light pipes 510. The light pipes may be routed throughout the capacitance module 500 passing through the second electrode layer 503, first electrode layer 502, and being connected to light holes 505 defined in the capacitance reference surface 501.

Light from the LED array 509 may appear in each of the light holes 505 defined in the capacitance reference surface 501 after being projected through the light pipes 509. The illuminated light holes 505 may serve as light feedback to the user. For example, The LEDs may be programmed to blink under certain conditions. Light holes formed in a capacitance reference surface may be defined to form symbols. These symbols may be illuminated by an LED array to communicate extra information to a user.

The component layer 504 includes a processor 508. The processor 508 is dedicated to the operation of the capacitance module 500. In instances where the capacitance module is incorporated into an electronic device such as a laptop or other personal computer device, the processor 508 may be in communication with the central processing unit (CPU) of the personal computer device. In such instances, the processor 508 may be the only component of the capacitance module 500 in communication with the CPU of the personal computer device. The processor 508 may be in communication with all other components 511 on the component layer, along with other components of the capacitance module 500 such as the first set 506a or second set 506b of electrodes, the LED array 509, or the haptic motors 507.

Haptic motors 507 are located adjacent to the component layer 504. When activated, the haptic motors 507 may vibrate, creating tactile feedback which may be felt through the capacitance reference surface 501 by the user.

While the capacitance module 500 includes four haptic motors 507 in this example, in other examples, a capacitance module may include a different number of haptic motors. Additionally, while the haptic motors 507 are arranged in the corners of the capacitance module 500, in other examples, haptic motors may be located differently in a capacitance module. For example, a capacitance module may have a single haptic motor located underneath the center of the capacitance reference surface, two haptic motors located underneath the right and left sides of the capacitance reference surface, two haptic motors located underneath the top and bottom sides of the capacitance reference surface, etc.

The haptic motors 507 may be eccentric rotating mass (ERM) vibration motors, linear resonance actuator (LRA) motors, piezoelectric actuator motors, another type of haptic motor, or combinations thereof. In examples where the haptic motors 507 are piezoelectric actuator motors or another type of haptic motor, the haptic motors may also function as pressure sensors.

The capacitance module 500 may be used to tell a human apart from a computer or computer program. To verify whether a user is human or not, the capacitance module 500 may first communicate a human-perceptible prompt using feedback devices in the capacitance module. The prompt may be tactile feedback caused by vibrations from the haptic motors 507, blinking lights on the capacitance reference surface 501 from the LED array 509, another type of prompt, or combinations thereof. Because the prompt is communicated by generating some physical phenomenon, such as a vibration, a visual stimulus, or the like, the prompt may be imperceptible to a computer processor, particularly the CPU of a device the capacitance module 500 may be incorporated into.

Once the prompt has been communicated by the capacitance module 500, a user may respond to the prompt by interacting with the capacitance module. The input a capacitance module receives after a prompt has been communicated may be used to verify if a user is human or not. The verification may be based on whether the response matches the communicated prompt. For example, if a prompt is a series of four vibrations throughout all of the capacitance module 500, the matched response might be a series of four taps onto the capacitance reference surface. Such taps may be measured by the capacitance sensor and/or a pressure sensor incorporated into the capacitance module. In other examples, if a prompt is a blinking light on the capacitance reference surface 501, the matched response might be covering the blinking light. In such an example, the covering of the blinking light may be detected by the capacitance sensor and/or a pressure sensor incorporated into the capacitance module. Other prompts, responses, and variations thereof are also possible.

If the response matches the prompt, a user may be verified as human. If the response does not match the prompt, or there is not response at all, the verification process may fail, and a user may not be verified as human.

The verification may be determined by the capacitance module. In some examples, the CPU may instruct the capacitance module to verify whether a human is operating the program, and the capacitance module may respond to the CPU with only that human verification passed or failed. The CPU may not be aware of the verification code that the capacitance module generates for the human user to input back into the capacitance module. The CPU may be unaware of what the user inputs into the capacitance module. In some examples, the CPU is blocked from being able to access any human-verification information from the capacitance module. By keeping the code generation and input receiving down locally at a level that is even inaccessible to the CPU, the human verification process is at a lower risk of being hacked from an outside influence. If the human verification code is generated over the internet, hacking programs may have more opportunity or access to negatively affect the human verification process, In some cases, even if the human verification code is accessible to the CPU, hacking programs may still have more opportunity or access to the negative influence the human verification process.

In some examples, the human verification program may not receive instructions from the CPU. For example, a user may instruct the capacitance module to download an update or to uninstall an update. Before allowing such updates or uninstallations, the capacitance module may self-initiate the human verification process before installing or uninstalling such software.

Figure 6:
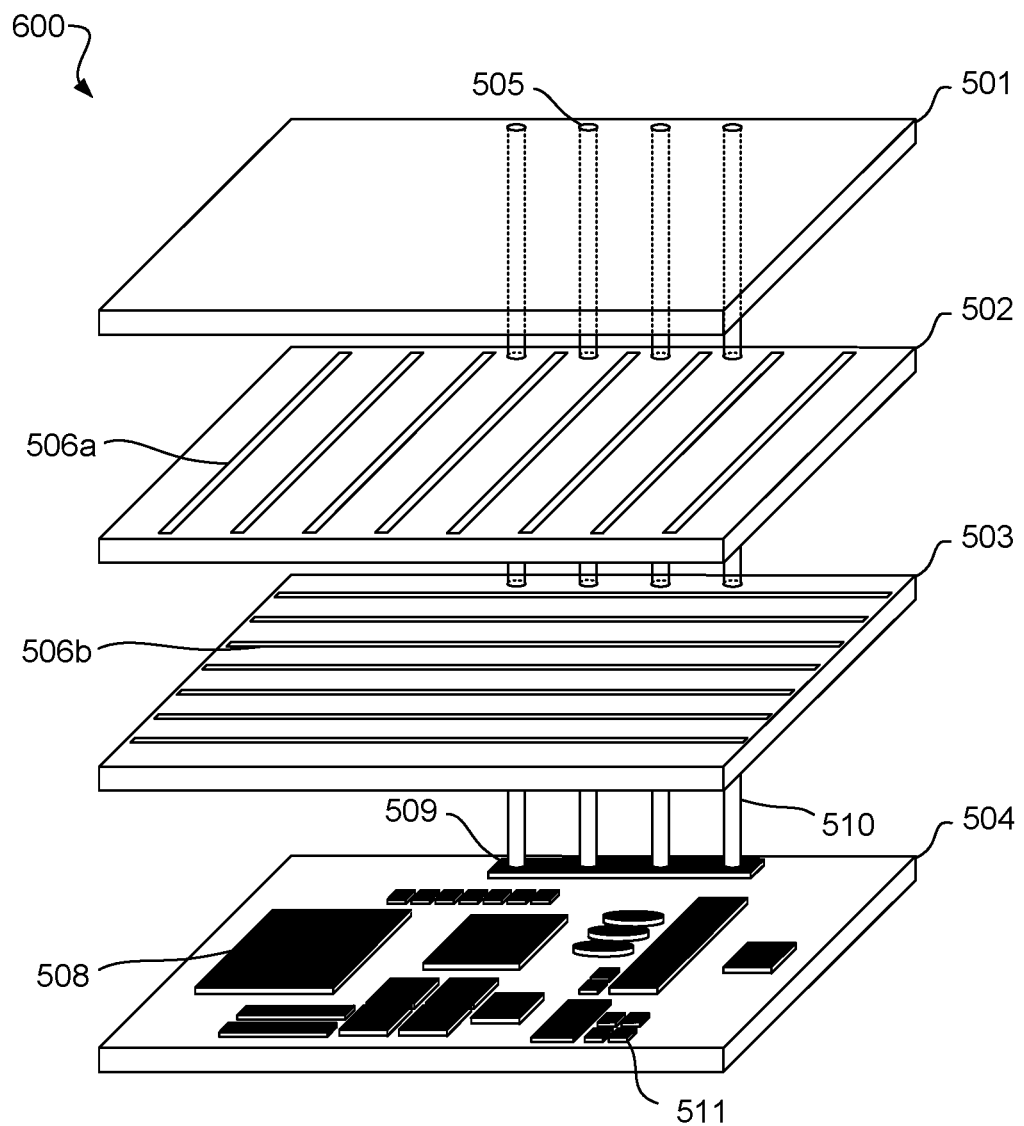
FIG. 6 depicts an example of a capacitance module in accordance with the disclosure.

FIG. 6 depicts an example of a capacitance module 600 in accordance with the disclosure. In this example, the capacitance module 600 does not include the haptic motors 507 included in the capacitance module 500. A human verification process using the capacitance module 600 may only include prompts based on light feedback, instead of prompts based on vibrational feedback.

Figure 7:
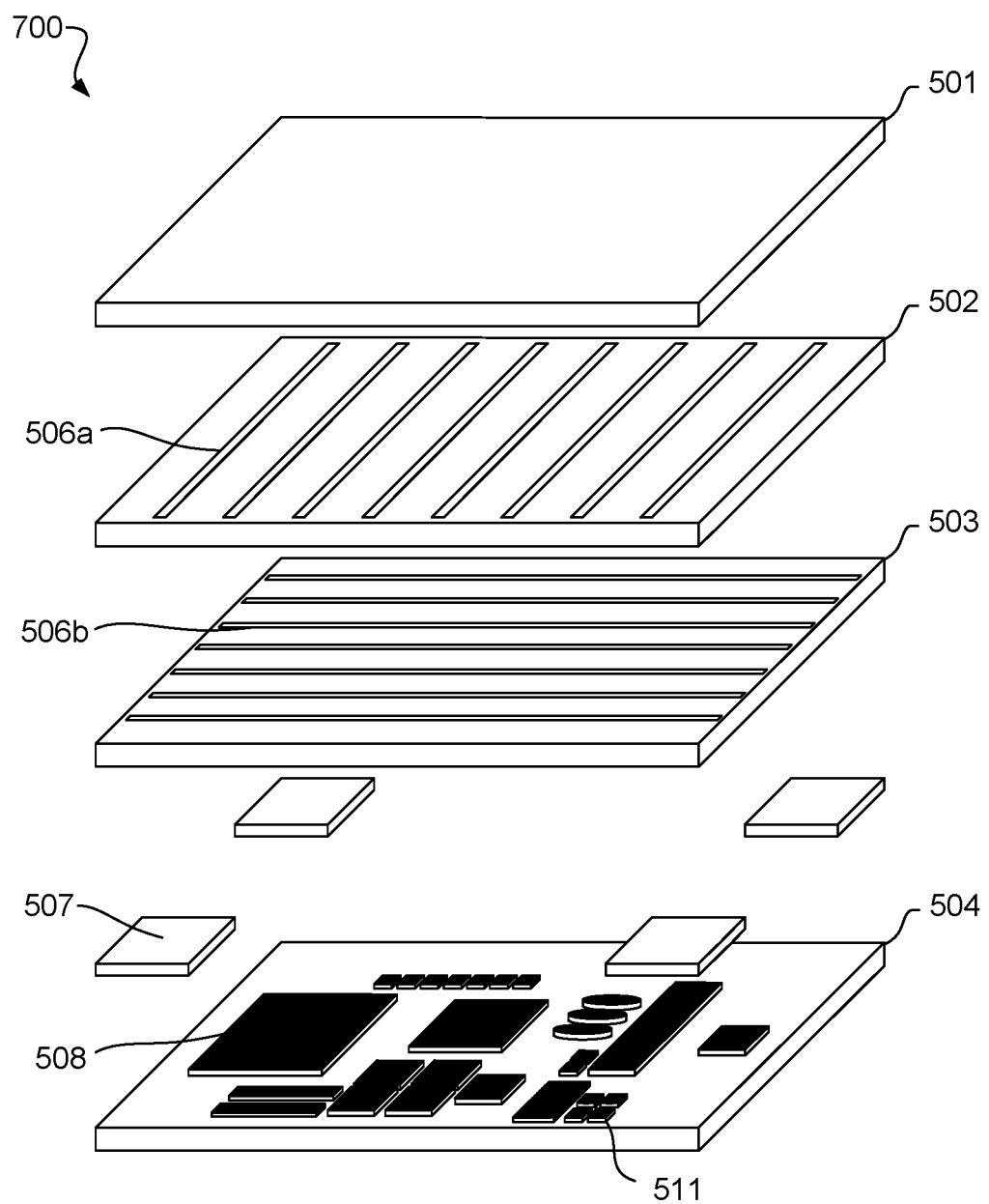
FIG. 7 depicts an example of a capacitance module in accordance with the disclosure.

FIG. 7 depicts an example of a capacitance module 700 in accordance with the disclosure. In this example, the capacitance module 700 does not include the LED array 509, light pipes 510, or light holes 505 included in the capacitance module 500. In this example, the haptic motors 507 are located between the second electrode layer 503 and the component layer 504. A human verification process using the capacitance module 700 may only include prompts based on vibrational feedback, instead of prompts based on light feedback.

Figure 9:
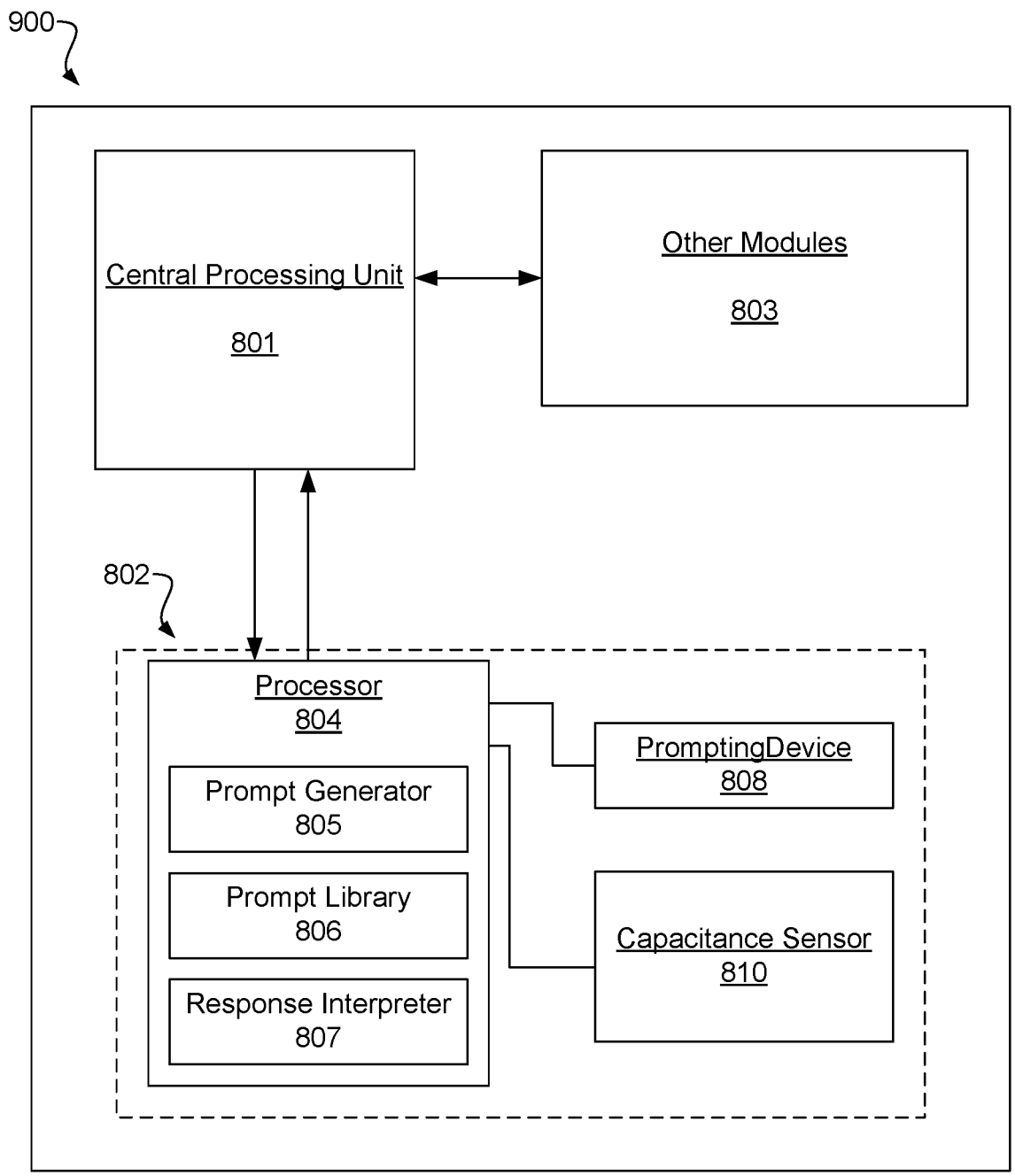
FIG. 9 depicts an example of a computer device in accordance with the disclosure.

FIG. 9 depicts an example of a computer device 800 in accordance with the disclosure. The computer device includes a central processing unit 801 in communication with a capacitance module 802 and other modules 803. The other modules 803 may include a display module, graphics module, etc. The capacitance module 802 includes a processor 804 in communication with a prompting device 808, user input detector 809, and capacitance sensor 810. While four elements are identified in the capacitance module 802, a capacitance module may incorporate more or less elements than those identified.

The processor 804 includes elements that may enable a process of human verification, including a prompt generator 805, a prompt library 806, and a response interpreter 807. The processor 804 may include more elements dedicated to other operations and processes of the capacitance module 802.

The human verification process may start with a request from the central processing unit 801 for verification. The central processing unit 801 sends the request for verification to the processor 804 of the capacitance module 802. Once the processor 804 has received the request for verification from the central processing unit 801, it generates a prompt using the prompt generator 805.

The prompt generator 805 determines which prompt to communicate to a user. The prompt generator 805 may determine which type of feedback the prompt will incorporate, as well as how much feedback will be communicated. For example, in cases where the capacitance module 802 includes haptic motors, the prompt generator 805 may determine to communicate the prompt using vibrational feedback. The prompt generator 805 may determine to communicate the vibrational feedback three times. The resulting prompt might be three vibrations across the capacitance module. In another example, in cases where the capacitance module 802 includes light holes, the prompt generator 805 may determine to communicate the vibrational prompt using light feedback. The prompt generator 805 may determine to communicate the light feedback by blinking an LED three times. The resulting prompt might be a light hole on the capacitance reference surface blinking three times. In yet another example, in cases where the capacitance module 802 includes both haptic motors and light holes, the prompt generator may determine to communicate the prompt using vibrational feedback or light feedback. The prompt generator may determine to communicate the feedback five times. The resulting prompt might be, for example, five vibrations across the capacitance module.

In order for the human verification process to be reliable and variable, the prompt generator 805 may ensure that the process of human verification varies across multiple iterations. The type of feedback chosen to communicate a prompt may be determined randomly from a pool of feedback options available to the capacitance module. The amount of feedback may also be determined randomly, or randomly within a set range. This way, it is possible that the prompt be different each time.

The prompt generator 805 may also determine a prompt by randomly selecting a prompt for the prompt library 806. The prompt library 806 may include many different types and variations of prompts that may be communicated. The prompts included in the prompt library 806 may be pre-programmed, or in other words, while the prompts selected from the prompt library 806 may be selected randomly, they may not be generated randomly.

Once a prompt has been generated by the prompt generator 805 in the processor, the processor communicated the prompt using the prompting device 808 in the capacitance module. The prompting device 808 incorporated into the capacitance module may be a haptic motor, LED array, audio speaker, another feedback device, or combinations thereof. In such an example, the prompting device is part of a layer or component that is built into or integrally part of the capacitance module. In some examples, the prompting device is controlled by the capacitance module's processor or at least in direct communication with the capacitance module's processor. In cases, all the components of the capacitance module, including the prompting device, are preassembled together and installed into a laptop, phone, electronic tablet, mobile device, etc. as a single unit.

In cases where a capacitance module includes multiple prompting devices, once the prompt has been generated, the processor 804 may communicate the type of prompt to the central processing unit 801 of the device. The central processing unit 801 may then communicate to the user the type of prompt that will be communicated so that the user knows how to respond. While the processor 804 may communicate the type of prompt to the central processing unit 801, it may not communicate the amount of feedback that the capacitance module will generate. This way, the central processing unit 801 is blind to the prompt and cannot correctly respond to the prompt on its own.

For example, in cases where a capacitance module includes haptic motors and an LED array as prompting devices, the prompt generator may determine to use a light feedback prompt. Once the prompt has been determined, the processor 804 may communicate to the central processing unit 801 that a light feedback prompt has been selected. The central processing unit 801 may then alert the user, visually or otherwise, to tap the capacitance reference surface of the capacitance module 802 as many times as a light on the capacitance reference surface blinks. The central processing unit 801 knows that a light feedback prompt will be communicated but does not know how many times the light on the capacitance reference surface will blink.

Once a prompt has been communicated by the prompting device 808, a user input detector 809 may detect a response. The user input detector 809 may be a pressure sensor, strain gauge, piezoelectric actuator motor, mechanical switch, a sense electrode, a capacitance sensor, another type of input device, or combinations thereof.

In some cases, the capacitance sensor 810 may be used to detect a response. In other cases, the capacitance sensor 810 may be used in combination with the user input detector 809 to detect a response.

A user response may be a number of taps, a number of taps in a certain location, a duration hold, a duration hold in a certain location, another type of input, or combinations thereof. Other parameters of user input may also be included in a response, such as intensity of input, etc.

The input detected by the user input detector 809 may be interpreted by the processor 804 using the response interpreter 807. The response interpreter 807 determines whether the response matches the communicated prompt. In one example, a response of four taps may match a prompt of four vibrations. In another example, a duration hold located on a light hole in a capacitance reference surface may match a prompt of illuminating a light hole in the capacitance reference surface. If the response matches a given prompt, the processor 804 may verify that a human is operating the capacitance module and not a computer or computer program.

Once the response has been interpreted by the response interpreter 807 and the processor 804 has either verified whether a human is operating the capacitance module or not, the processor may return a verification result to the central processing unit. The verification result returned to the central processing unit 801 may be as simple as a binary 1 or 0.

In some examples, the process of human verification using the capacitance module 802 is enabled, in part, because communication with the verification elements of the capacitance module 802 is restricted. In such examples, only the processor 804 is in direct communication with the prompting device 808 and user input detector 809. The central processing unit 801 is not in direct communication with either the prompting device 808 or user input detector 809. The central processing unit 801 may send a request for human verification to the processor 804 and it may even be alerted to the type of prompt being communicated, but it may be completely unable to perceive the prompt or even respond to it. By disabling the central processing unit 801 from participating in the human verification process, the authenticity of the process may be maintained and secure from malicious actors.

Figure 8:
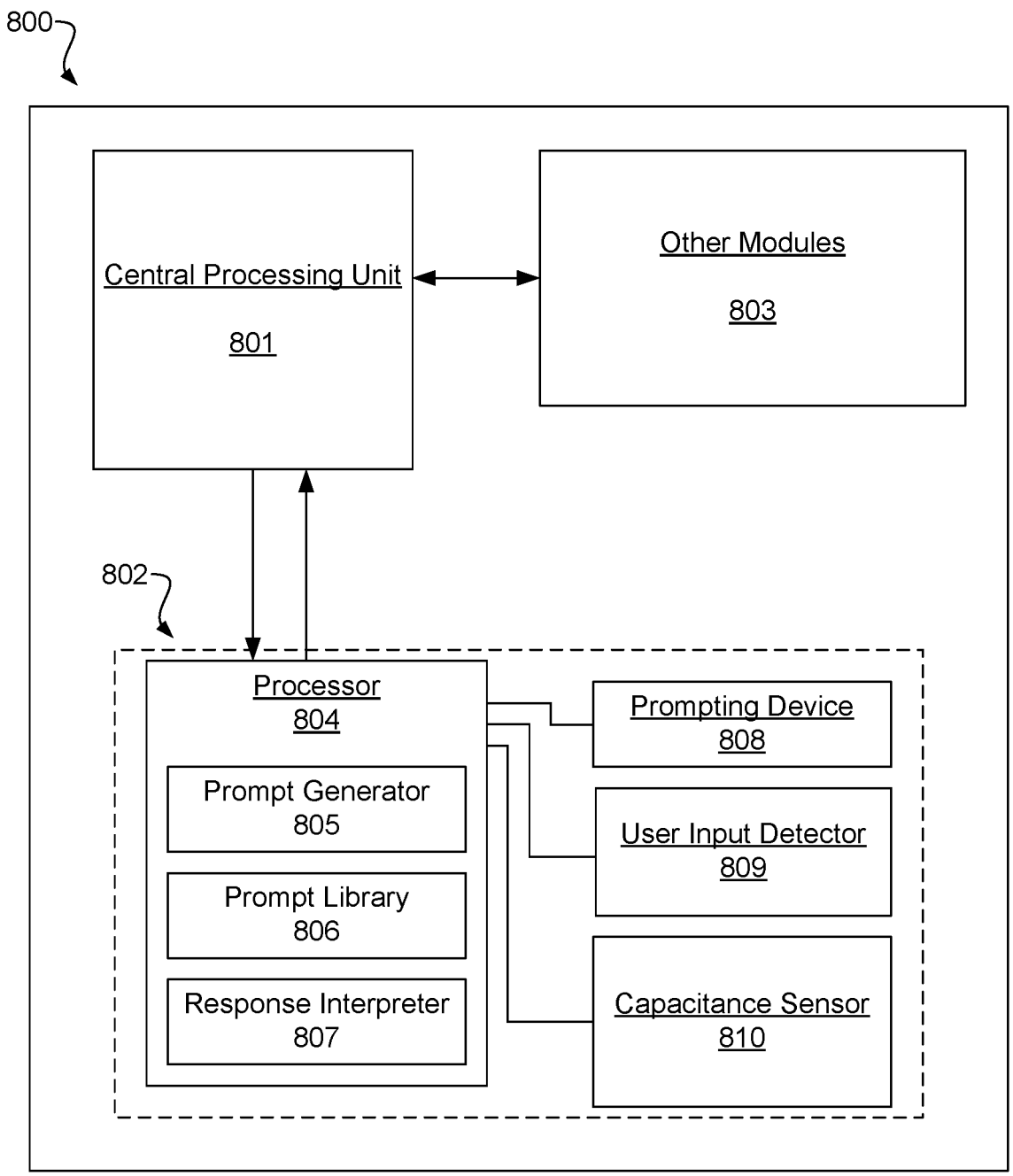
FIG. 8 depicts an example of a computer device in accordance with the disclosure.

FIG. 9 depicts an example of a computer device 900 in accordance with the disclosure. In this example, the capacitance module 802 does not include a dedicated user input detector as in FIG. 8. In cases where a capacitance module does not include a dedicated user input detector, the capacitance sensor may be used to detect input during a human verification process.

Figure 10:
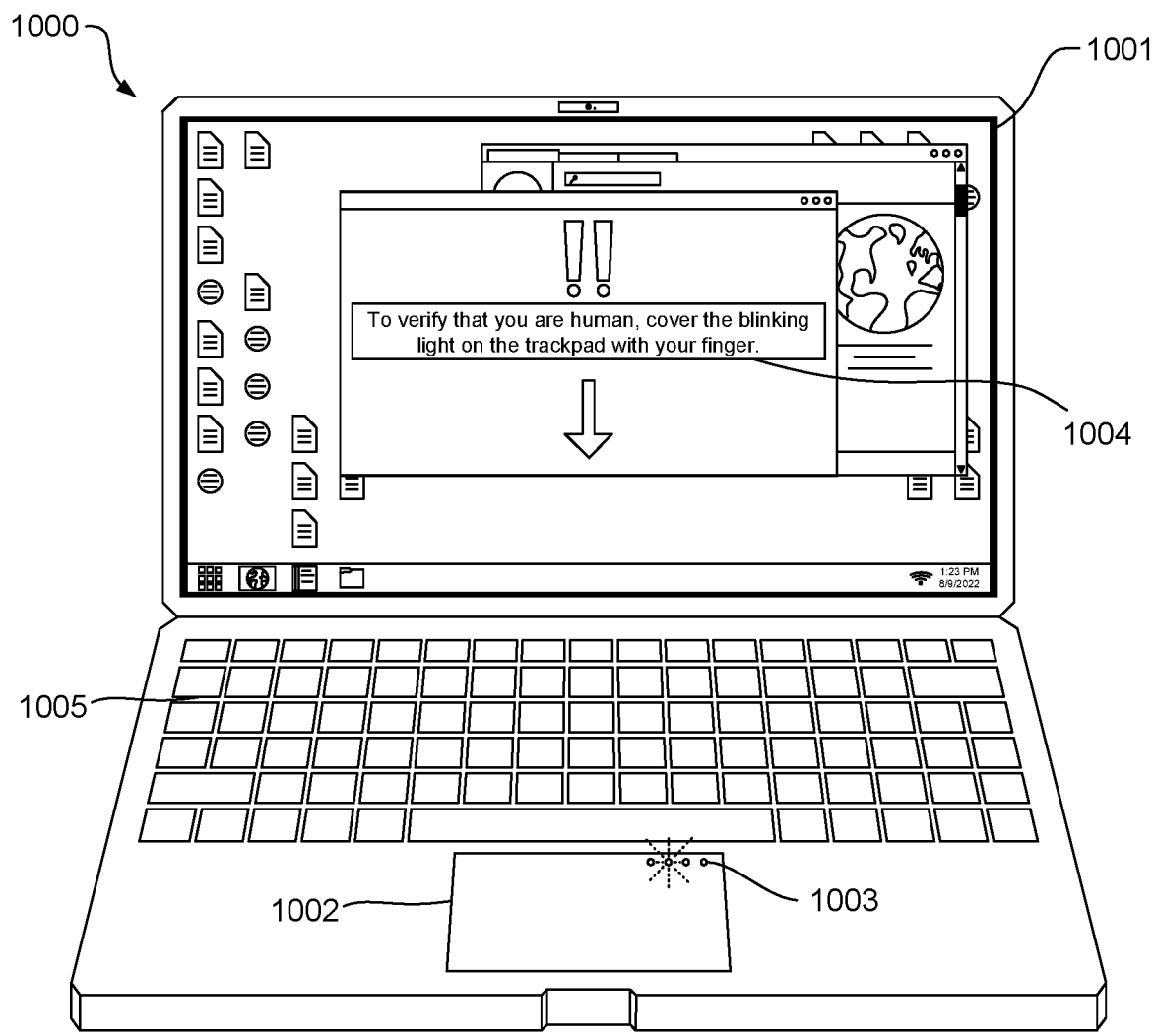
FIG. 10 depicts an example of a personal computer in accordance with the disclosure.

FIG. 10 depicts an example of a personal computer 1000 in accordance with the disclosure. In this example, the personal computer 1000 is a laptop. The personal computer 1000 includes a display 1001, keyboard 1005, and capacitance module 1002. In this example, the capacitance module 1002 is a trackpad.

The capacitance module 1002 includes four light holes 1003, of which one light hole is illuminated in order to communicate a prompt for human verification. Shown on the display 1001 is an instruction 1004, which indicates to the user the type of verification prompt and how to respond to the prompt.

Figure 11:
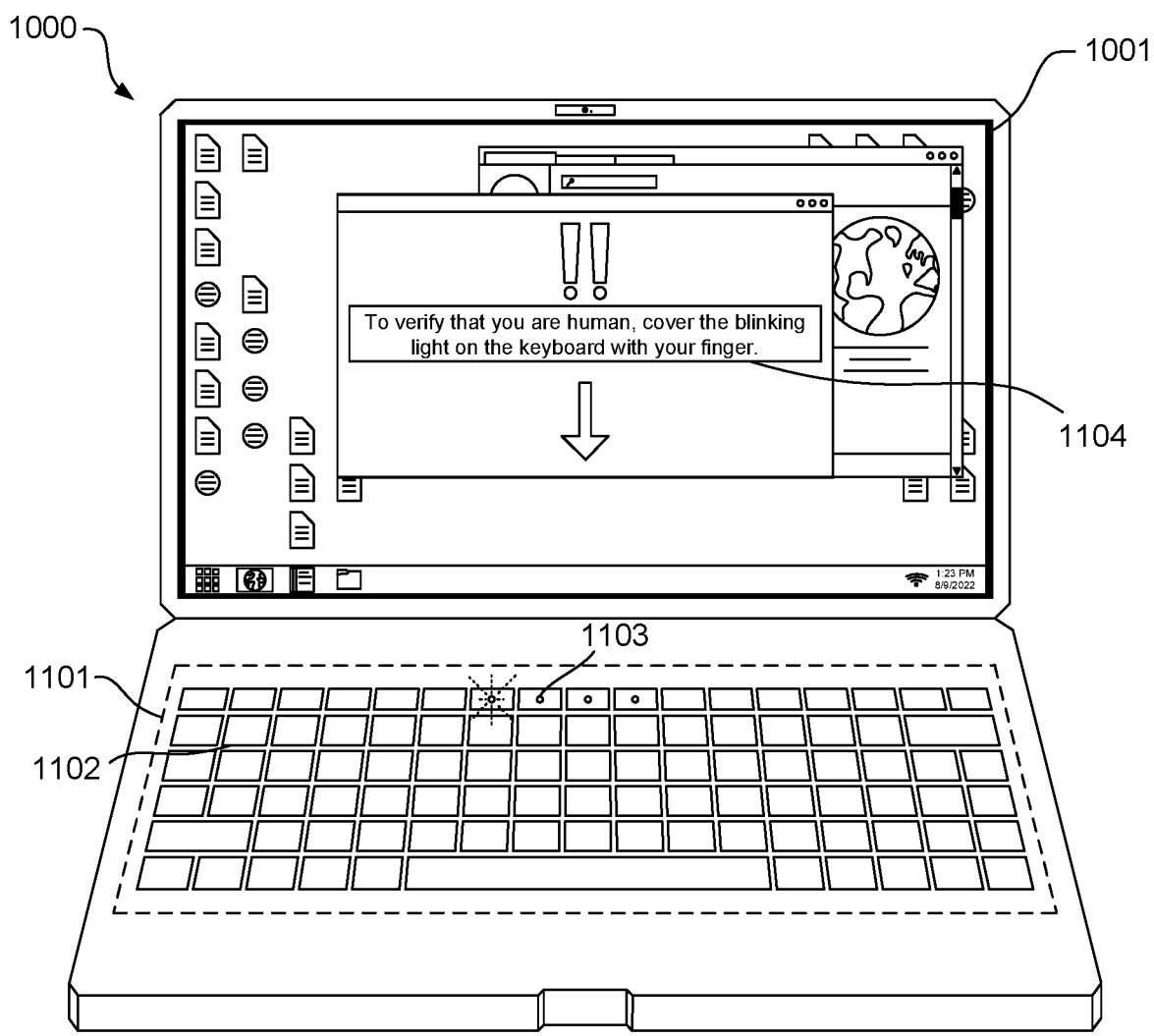
FIG. 11 depicts an example of a personal computer in accordance with the disclosure.

FIG. 11 depicts an example of a personal computer 1100 in accordance with the disclosure. While a capacitance module may be incorporated into a laptop as a trackpad, a capacitance module may be incorporated into a laptop differently. In this example, the personal computer 1100 is a laptop including a display 1001 and capacitance module 1101. The capacitance module 1101 may be incorporated into the personal computer 1100 as a capacitive keyboard.

The capacitance module 1101 includes keys 1102 that may be pressed. A user may also swipe or gesture over the capacitance module 1101 and use it as a trackpad. Because the capacitive keyboard may be used as both a keyboard and a trackpad, the personal computer 1100 may omit a dedicated trackpad.

In the depicted example, a set 1103 of lights is incorporated into some of the keys of the capacitance module 1101, one of which is illuminated. The display 1001 may show an instruction 1104 which indicates to the user the type of verification prompt and how to respond to the prompt.

Figure 12:
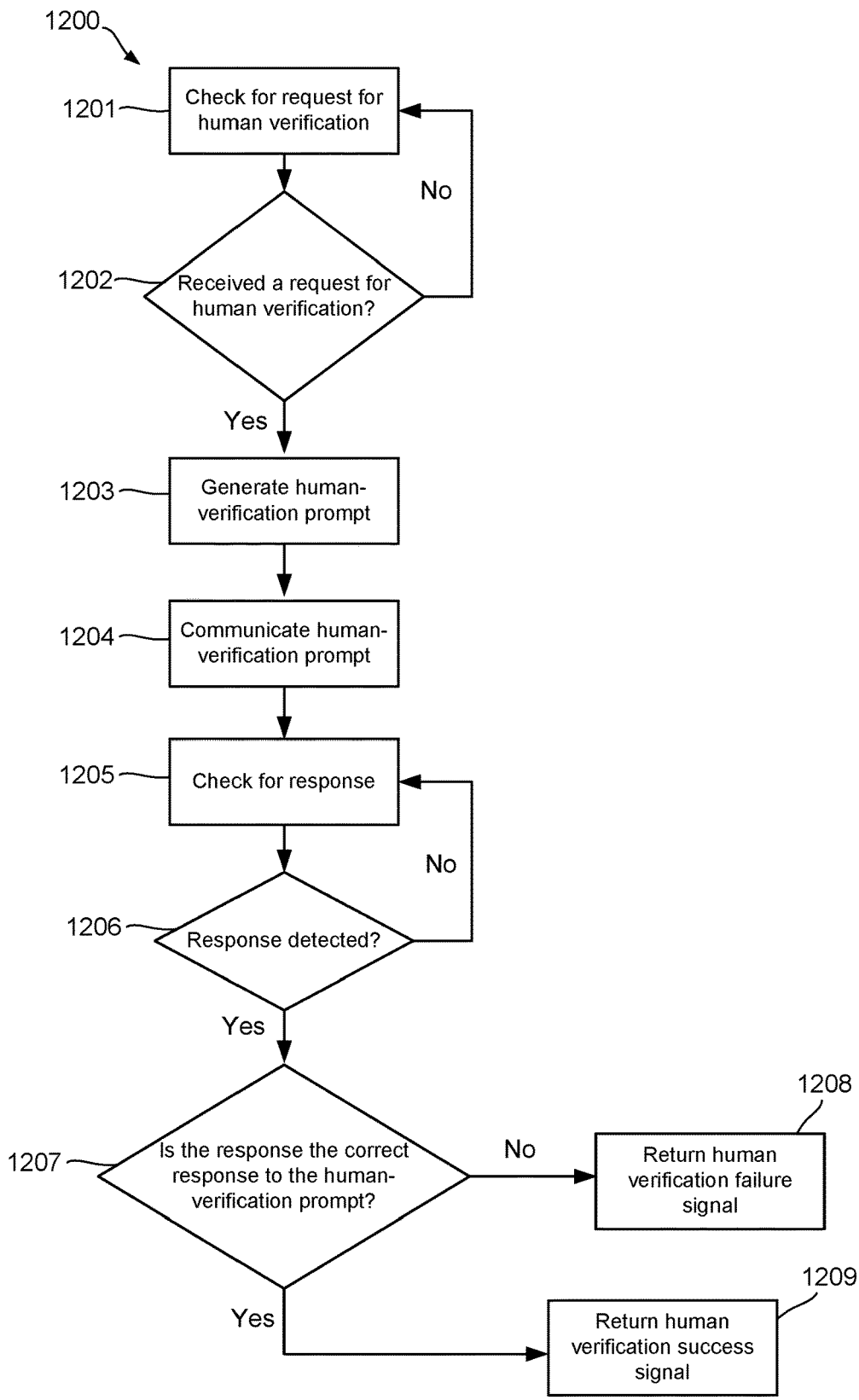
FIG. 12 depicts a method for human verification using a capacitance module in accordance with the disclosure.

FIG. 12 depicts a method 1200 for human verification using a capacitance module in accordance with the disclosure. This method 1200 may be performed based on the description of the devices, modules, and principles described in relation to FIGS. 1-11. In this example, a processor in a capacitance module may check 1201 for a request for human verification from an external processor, such as a CPU. If a request for human verification has been received 1202, the method 1200 generates 1203 a human-verification prompt, otherwise, the method 1200 checks for a request again. Once a human-verification prompt is generated, the human-verification prompt is then communicated 1204 using a prompting device in the capacitance module. This method 1200 include checking 1205 for a response using a user input detector in the capacitance module. If a response is detected, then the method 1200 checks whether the detected response is the correct response, otherwise, if no response is detected, then the method 1200 checks for a response again. Once the method 1200 has checked whether the detected response is the correct response to the human-verification prompt, if the response is correct, then the method 1200 returns 1209 a human verification success signal to the external processor. If the response is not correct, then the method 1200 returns 1208 a human verification failure signal to the external processor.

Figure 13A:
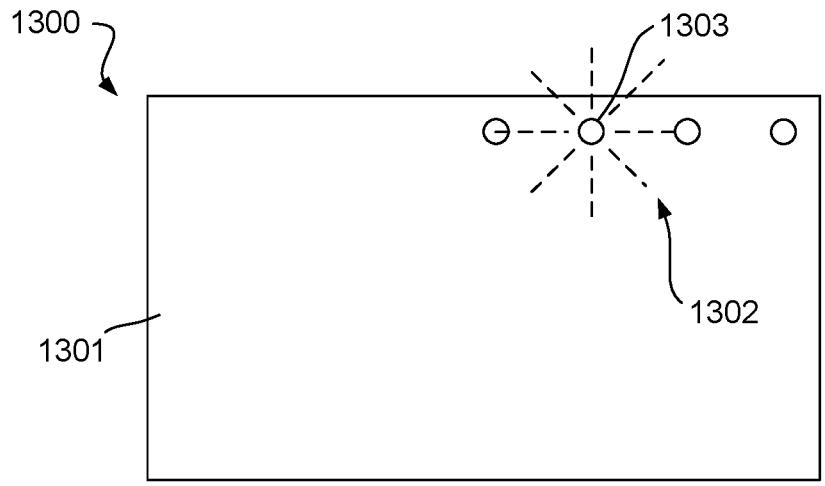
FIG. 13a depicts a human-verification prompt in accordance with the disclosure.

FIG. 13*a* depicts a human-verification prompt in accordance with the disclosure. In this example, a capacitance module 1300 is adjacent a capacitance reference surface 1301 with a set 1302 of light holes. An illuminated light hole 1303 is in the set 1302 of light holes. In this case, the human-verification prompt is an illuminated light source.

Figure 13B:
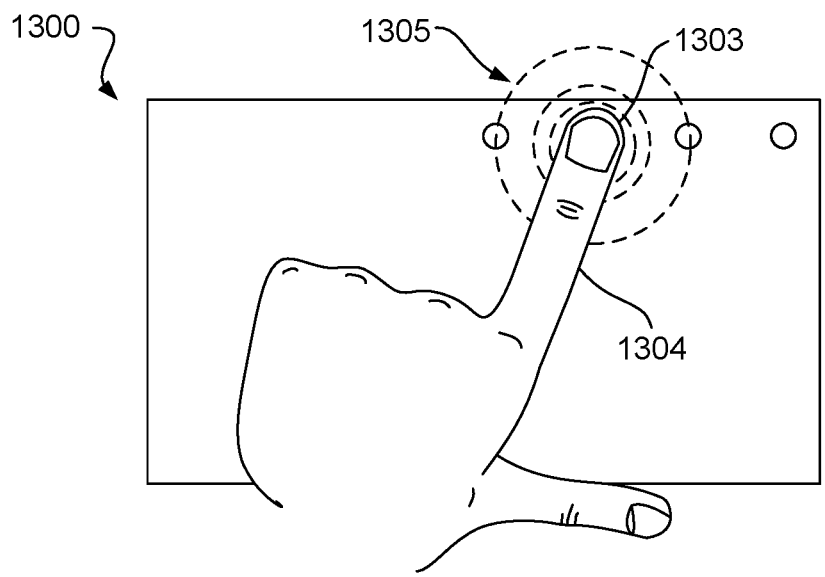
FIG. 13b depicts a user response in accordance with the disclosure.

FIG. 13*b* depicts a user response in accordance with the disclosure. The user may interact with the capacitance module 1300 using a finger 1304. The user may respond to the prompt by touching the illuminated light 1303 with a tap 1305.

Figure 14:
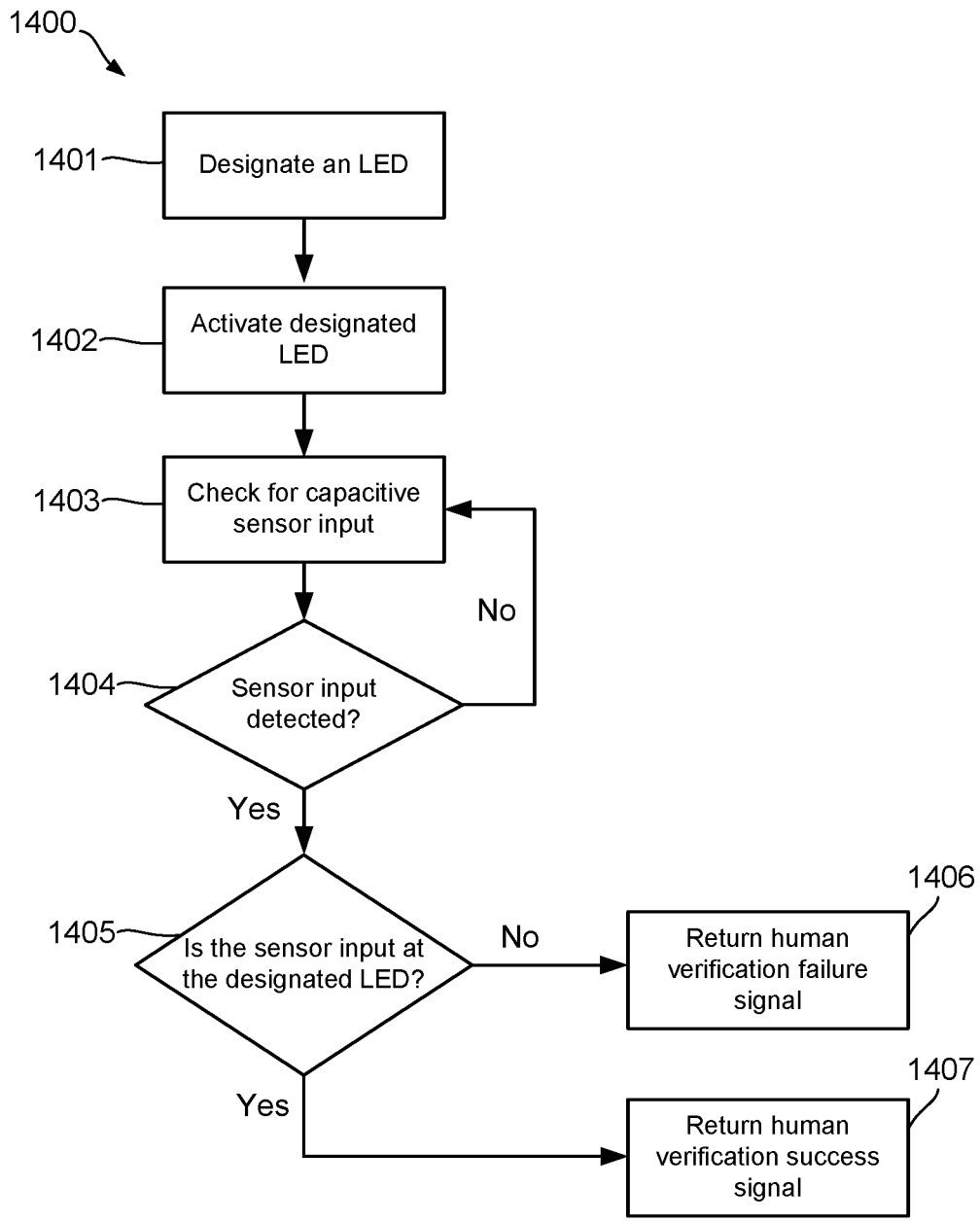
FIG. 14 depicts a method for human verification using a capacitance module in accordance with the disclosure.

FIG. 14 depicts a method 1400 for human verification using a capacitance module in accordance with the disclosure. This method 1400 may be performed based on the description of the devices, modules, and principles described in relation to FIGS. 1-11, 13*a*, and 13*b*. An LED in the capacitance module 1300 is designated 1401 by the processor in the capacitance module and then activated 1402. Once the LED has been activated, the method 1400 checks 1404 for sensor input on the capacitance sensor of the capacitance module 1300. If input is detected, then the method 1400 determines 1405 if the input is at the designated LED. If no input is detected, then the method 1400 checks for sensor input again. If the sensor input is in the correct location, then the method 1400 returns 1407 a human verification success signal. If the sensor input is not in the correct location, then the method 1400 returns 1406 a human verification failure signal.

Figure 15A:
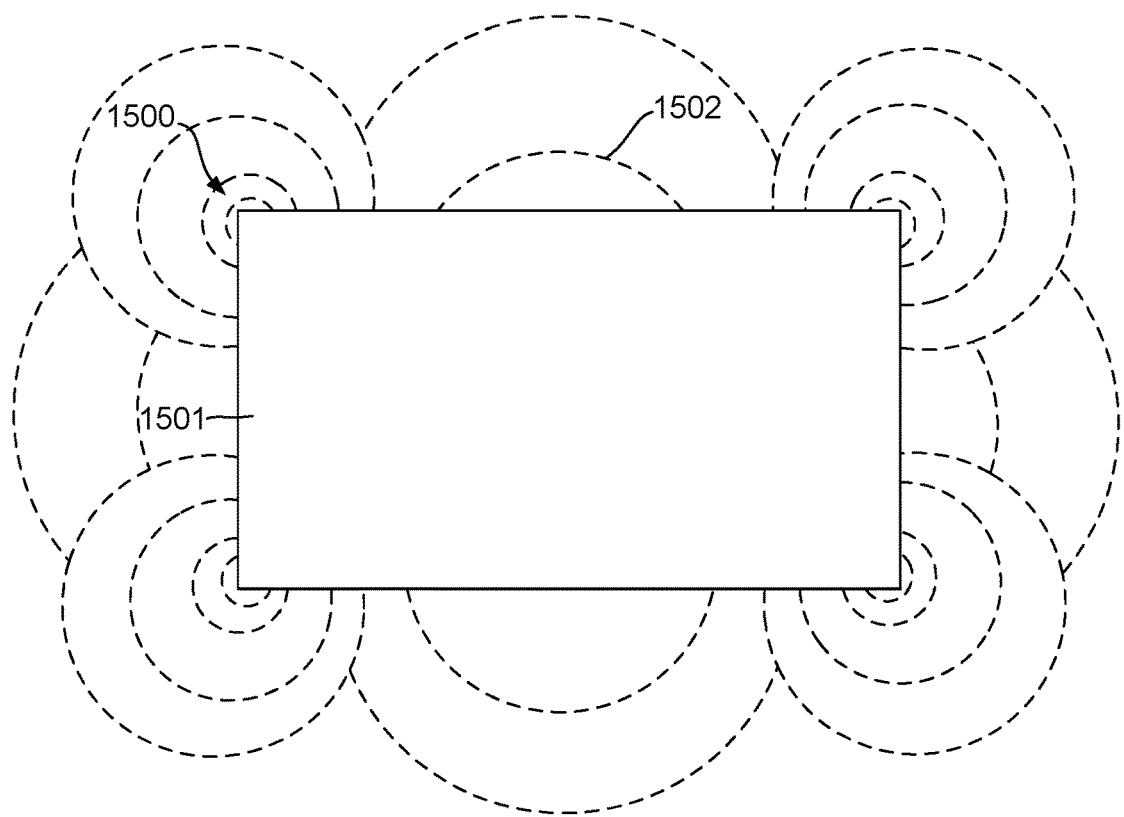
FIG. 15a depicts a human-verification prompt in accordance with the disclosure.

FIG. 15*a* depicts a human-verification prompt in accordance with the disclosure. In this example, a capacitance module 1500 includes haptic motors located underneath its capacitance reference surface 1501. Using the haptic motors, the capacitance module 1500 may create a vibration 1502. The capacitance module 1500 may create multiple vibrations in sequence using the haptic motors. In this case, the human-verification prompt is a sequence of haptic vibrations.

Figure 15B:
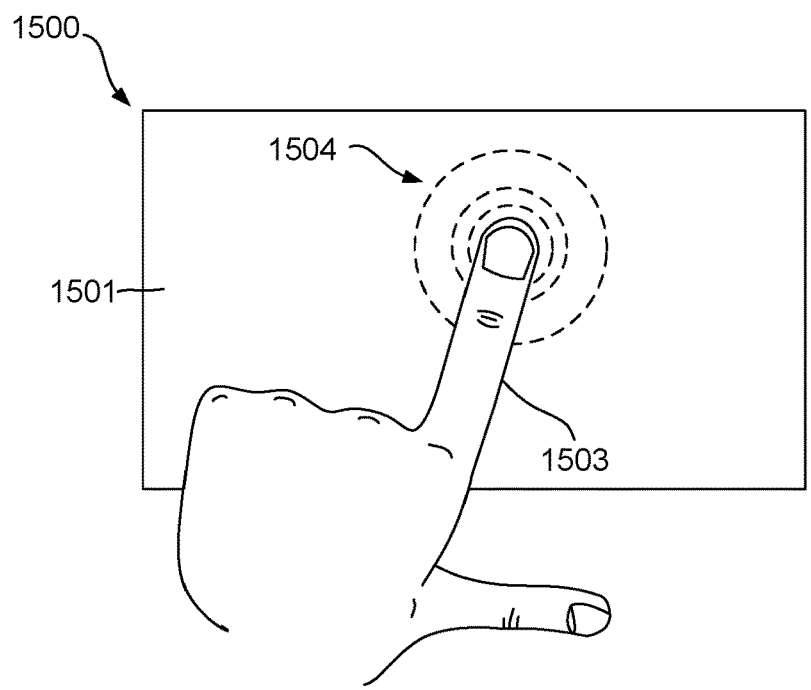
FIG. 15b depicts a user response in accordance with the disclosure.

FIG. 15*b* depicts a user response in accordance with the disclosure. The user may interact with the capacitance module 1500 using a finger 1503. The user may respond to the prompt by touching the capacitance reference surface 1501 with a tap 1504. The user may tap the capacitance reference surface 1501 with a sequence of taps corresponding to the sequence of vibrations created by the capacitance module 1500.

Figure 16:
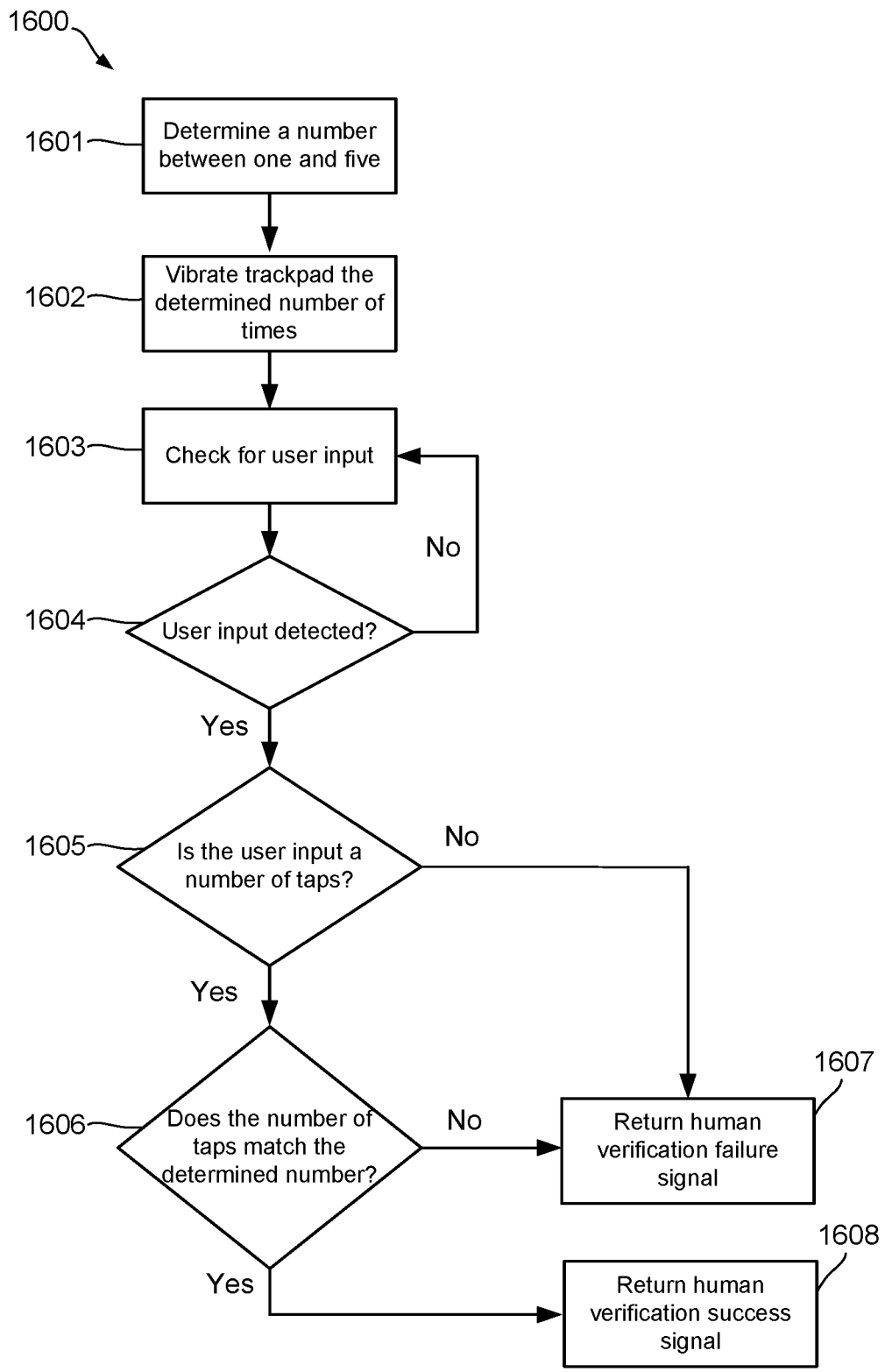
FIG. 16 depicts a method for human verification using a capacitance module in accordance with the disclosure.

FIG. 16 depicts a method 1600 for human verification using a capacitance module in accordance with the disclosure. This method 1600 may be performed based on the description of the devices, modules, and principles described in relation to FIGS. 1-11, 15*a*, and 15*b*. This method 1600 includes determining 1601 a number between one and five or another appropriate number by a processor in the capacitance module. The method 1600 then vibrates 1602 the trackpad the determined number of times using haptic motors in the capacitance module 1500. Once the trackpad has been vibrated, the method 1600 checks 1603 for user input using a user input sensor in the capacitance module 1500. If user input is detected 1604, then the method 1600 determines 1605 if the input is in the correct location. If no input is detected, then the method 1600 checks for sensor input again. If the sensor input is in the correct location, then the method 1600 returns 1407 a human verification success signal. If the sensor input is not in the correct location, then the method 1600 returns 1406 a human verification failure signal.

Figure 17A:
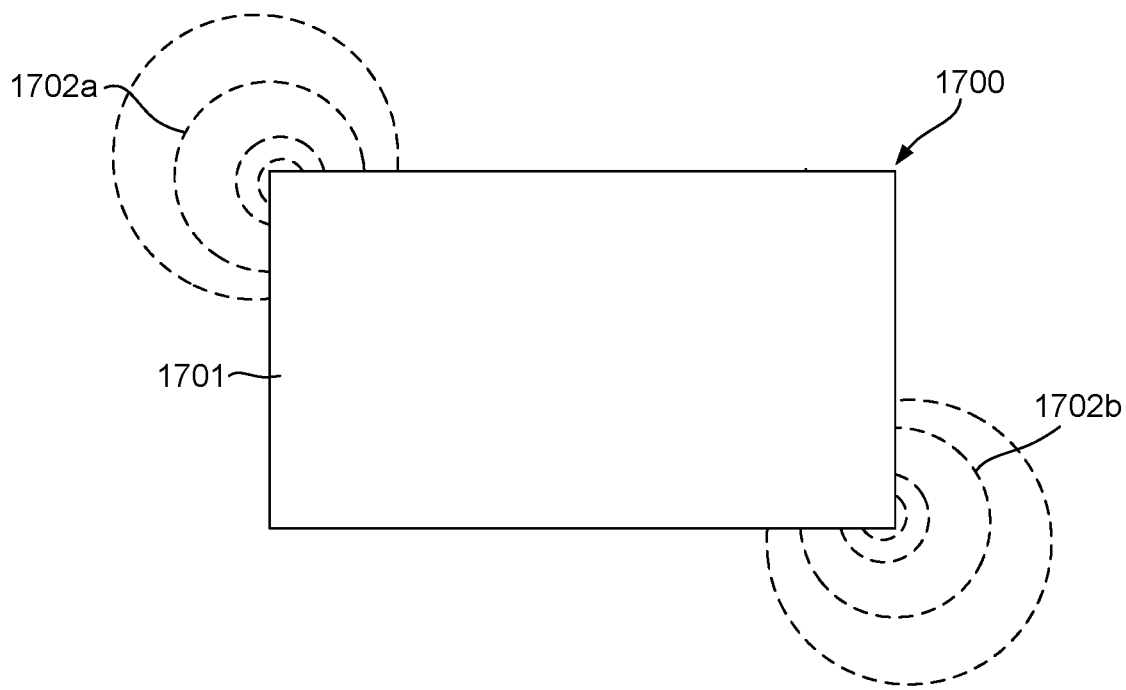
FIG. 17a depicts a human-verification prompt in accordance with the disclosure.

FIG. 17*a* depicts a human-verification prompt in accordance with the disclosure. In this example, a capacitance module 1700 includes haptic motors underneath a capacitance reference surface 1701. Using the haptic motors, the capacitance module 1700 may create a first vibration 1702*a* underneath one corner of the capacitance reference surface 1701 and a second vibration 1702*b* underneath another corner of the capacitance reference surface. The first vibration 1702*a* and second vibration 1702*b* may be created simultaneously or at different times. In this case, the human-verification prompt is two vibrations located at different parts of the capacitance module 1700.

Figure 17B:
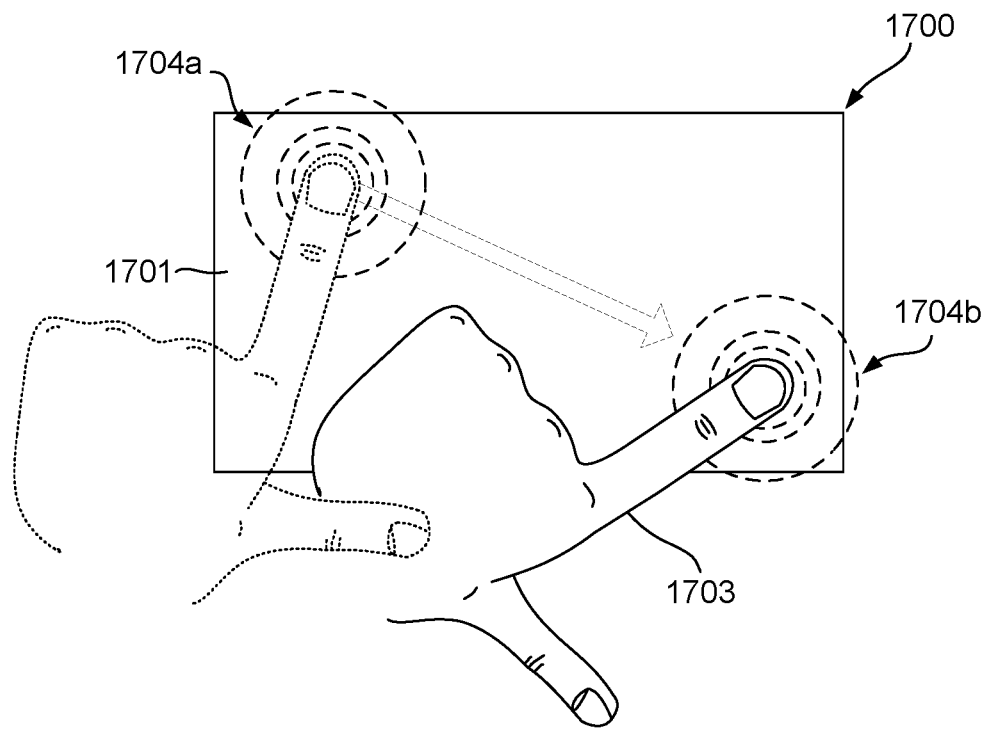
FIG. 17b depicts a user response in accordance with the disclosure.

FIG. 17*b* depicts a user response in accordance with the disclosure. The user may interact with the capacitance module 1700 using a finger 1703. The user may respond to the prompt by tapping the capacitance reference surface 1701 with a first tap 1704*a* in one location and tapping the capacitance reference surface with a second tap 1704*b* in a second location. The first tap 1704*a* may correspond to the location of the first vibration, and the second tap 1704*b* may correspond to the location of the second vibration.

Figure 18:
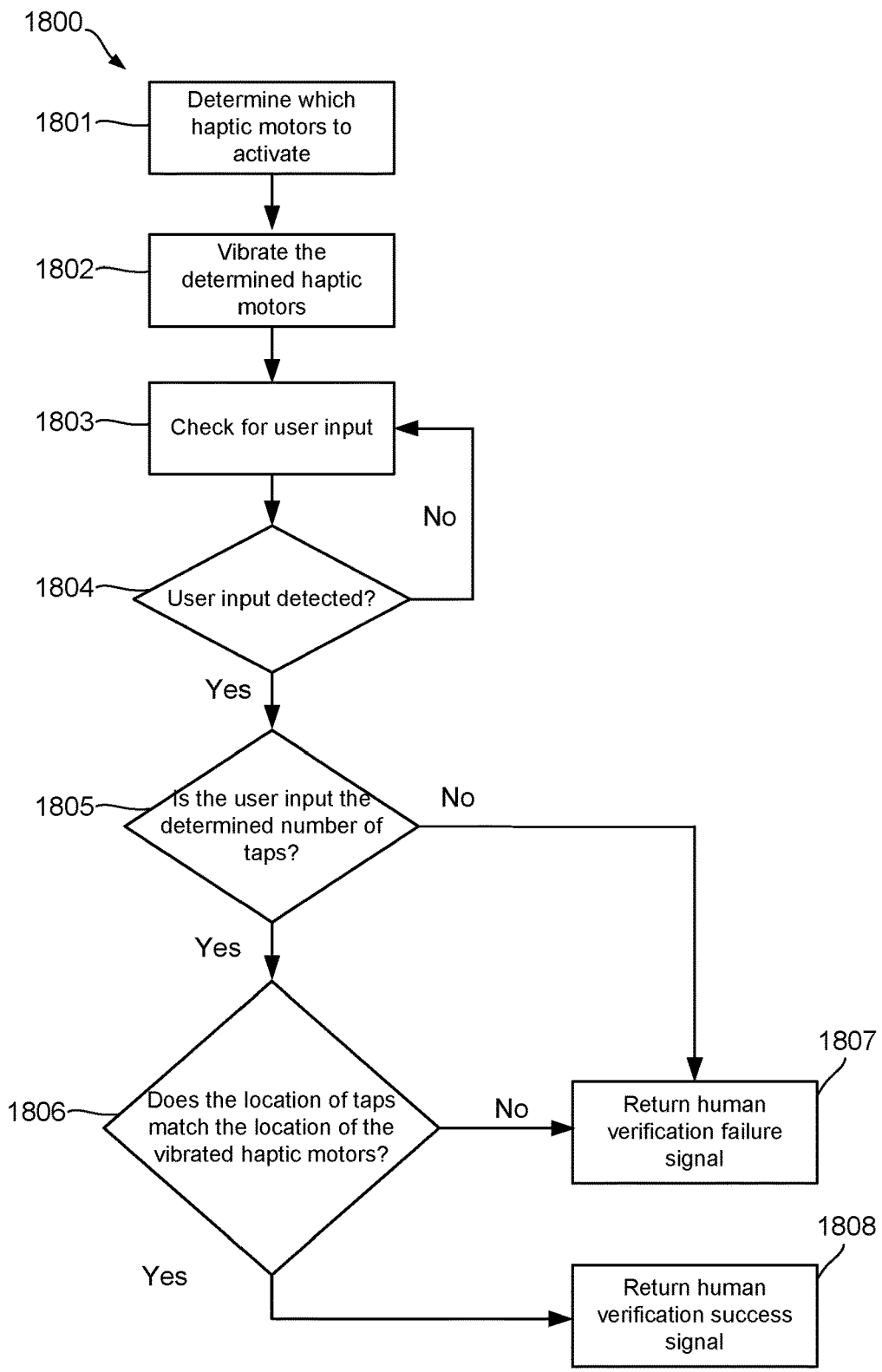
FIG. 18 depicts a method for human verification using a capacitance module in accordance with the disclosure.

FIG. 18 depicts a method 1800 for human verification using a capacitance module in accordance with the disclosure. This method 1800 may be performed based on the description of the devices, modules, and principles described in relation to FIGS. 1-11, 17*a*, and 17*b*. This method 1800 includes determining 1801 which haptic motors to activate by a processor of a capacitance module. The method 1800 then vibrates 1802 the determined haptic motors. Once the haptic motors have been vibrated, the method 1800 checks 1803 for user input. If no user input has been detected, then the method 1800 checks again. If user input has been detected 1804, then the method 1800 determines whether the user input is the determined number of taps 1805. If the input is not the determined number of taps, then the capacitance module returns 1807 a human verification failure signal. If the input is a number of taps, then the method 1800 determines if the location of the taps matches the location of the vibrated haptic motors 1806. If the location of taps matches the location of the vibrated motors, then the capacitance module 1700 returns 1808 a human verification success signal. If the location of taps does not match the location of the vibrated motors, then the capacitance module 1700 returns 1807 a human verification failure signal.

Figure 19A:
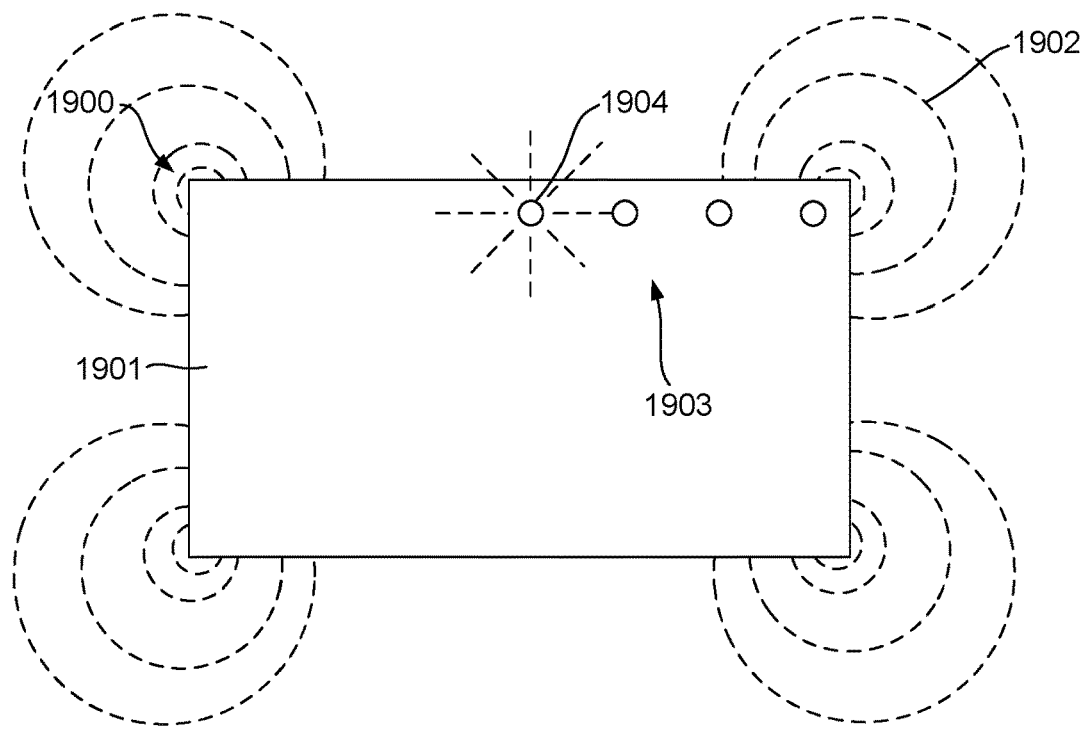
FIG. 19a depicts a human-verification prompt in accordance with the disclosure.

FIG. 19*a* depicts a human verification prompt in accordance with the disclosure. In this example, a capacitance module 1900 includes haptic motors underneath its capacitance reference surface 1901. The capacitance module 1900 may create a vibration 1902 using the haptic motors. The capacitance module 1900 may create multiple vibrations 1902 in sequence.

The capacitance module 1900 includes a set 1903 of light holes defined in the capacitance reference surface 1901. An illuminated light hole 1904 is included in the set 1903. In this case, the human verification prompt is a sequence of haptic vibrations and an illuminated light.

Figure 19B:
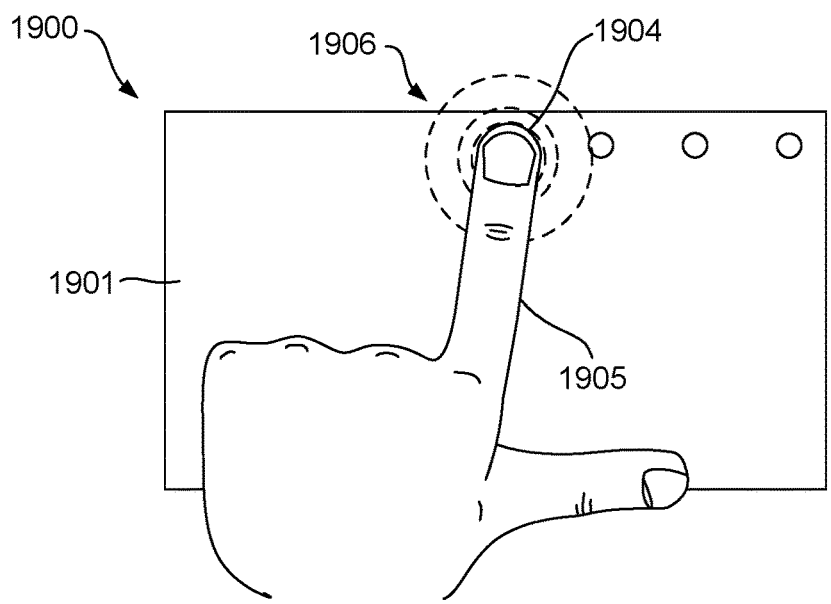
FIG. 19b depicts a user response in accordance with the disclosure.

FIG. 19*b* depicts a user response in accordance with the disclosure. The user may interact with the capacitance module 1900 using a finger 1905. The user may respond to the prompt by touching the capacitance reference surface 1901 with a tap 1906. The user may tap the illuminated light 1904 with a sequence of taps that matches the sequence of haptic vibrations produced by the capacitance module 1900.

Figure 20:
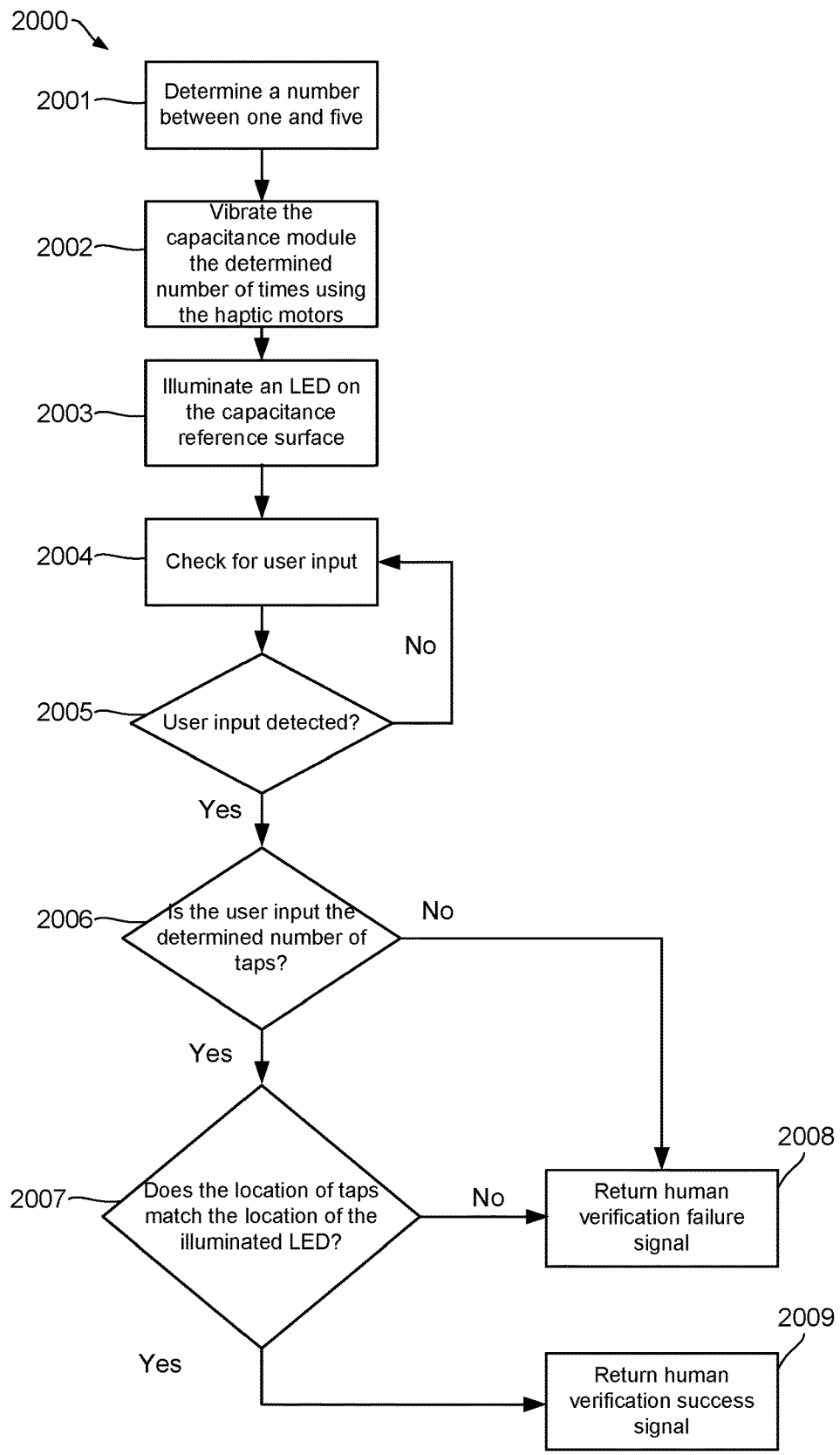
FIG. 20 depicts a method for human verification using a capacitance module in accordance with the disclosure.

FIG. 20 depicts a method 2000 for human verification using a capacitance module in accordance with the disclosure. This method 1800 may be performed based on the description of the devices, modules, and principles described in relation to FIGS. 1-11, 17*a*, and 17*b*. This method 1800 includes determining 2001 a number between one and five or another appropriate number by a processor of a capacitance module. The method 1800 then vibrates 2002 the capacitance module the determined number of times using the haptic motors. The method 1800 illuminates 2003 an LED on the capacitance reference surface. The method 1800 then checks 2004 for user input. If no input has been detected, then the method 1800 checks again. If user input has been detected 2005, then the method 1800 determines if the user input is the determined number of taps 2006. If the user input is not the determined number of taps, then the method 1800 returns 2008 a human verification failure signal. If the user input is a number of taps, then the processor method 1800 whether the location of taps matches the location of the illuminated LED 2007. If the location of taps matches the location of the illuminated LED, then the method 1800 returns 2009 a human verification success signal. If the location of taps does not match the location of the illuminated LED, then the processor returns 2008 a human verification failure signal.

Figure 21:
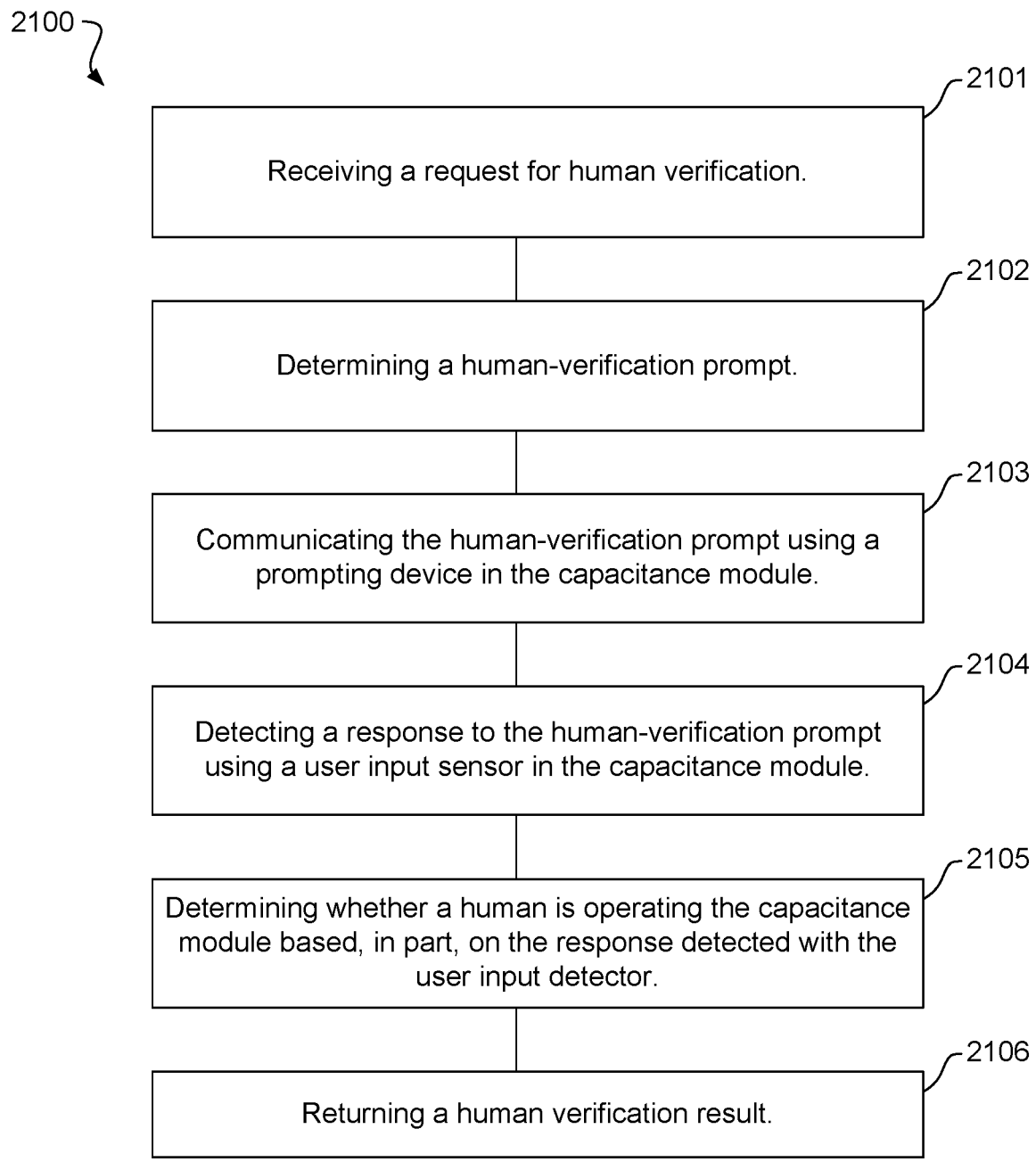
FIG. 21 depicts a method for telling a human apart from a computer using a capacitance module in accordance with the disclosure.

FIG. 21 depicts a method 2100 for telling a human apart from a computer using a capacitance module in accordance with the disclosure. This method 1800 may be performed based on the description of the devices, modules, and principles described in relation to FIGS. 1-20. The method 2100 includes receiving 2101 a request for human verification, determining 2102 a human-verification prompt, communicating 2103 the human-verification prompt using a prompting device in the capacitance module, detecting 2104 a response to the human-verification prompt using a user input sensor in the capacitance module, determining 2105 whether a human is operating the capacitance module based, in part, on the response detected with the user input detector, and returning 2106 a human verification result.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a prompting device;
a processor in communication with the prompting device;
the processor being embedded into the capacitance module and dedicated to operating the capacitance module;
memory in communication with the processor;
wherein the memory contains programmed instructions that cause the capacitance module, when activated, to:
determine a human-verification prompt that distinguishes a human from a computer; and
communicate the human-verification prompt using the prompting device.

2. The module of claim 1, wherein the capacitance module is in communication with a central processing unit programmed to execute non-capacitance module operations;
wherein the human-verification prompt is imperceptible to the central processing unit.

3. The module of claim 2, the processor further including:
a request bus; and
response bus;
wherein the programmed instructions cause the processor, when activated, to:
receive a human-verification request from the central processing unit over the request bus; and
send a human-verification result to the central processing unit over the response bus.

4. The module of claim 2, further comprising:
the central processing unit programmed to execute non-capacitance module operations;
wherein the human-verification prompt is not communicated to the central processing unit.

5. The module of claim 1, further comprising:
a user input detector;
wherein the programmed instructions cause the capacitance module, when activated, to:
detect a response to the human-verification prompt using the user input detector.

6. The module of claim 5, wherein the programmed instructions cause the capacitance module, when activated, to:
determine whether a human is operating the capacitance module based, in part, on the response detected by the user input detector.

7. The module of claim 6, wherein determining whether a human is operating the capacitance module includes detecting a parameter indicated by the human-verification prompt.

8. The module of claim 7, wherein the parameter is a number of taps, a duration hold, a user input location, an intensity, or combinations thereof.

9. The apparatus of claim 5, wherein the user input detector is a capacitive sensor.

10. The module of claim 5, wherein the user input detector is a pressure sensor.

11. The module of claim 1, wherein the prompting device includes a haptic motor.

12. The module of claim 11, wherein the human-verification prompt is communicated by the haptic motor by generating a vibration.

13. The module of claim 1, wherein the prompting device includes a light source.

14. The module of claim 13, wherein the human-verification prompt is communicated by the light source by generating a light output.

15. The module of claim 1, wherein the human-verification prompt is selected from a number of pre-programmed prompts.

16. The module of claim 1, wherein the human-verification prompt is generated by the processor.

17. A method for telling a human apart from a computer using a capacitance module, comprising:
receiving a request for human verification;
determining a human-verification prompt that distinguishes between a human and a computer;
communicating the human-verification prompt using a prompting device in the capacitance module;
detecting a response to the human-verification prompt using a user input sensor in the capacitance module;
determining whether a human is operating the capacitance module based, in part, on the response detected with the user input detector; and
returning a human verification result.

18. The method of claim 17, wherein the request for human verification is sent to the capacitance module by an external processor and the human verification result is returned to the external processor.

19. The method of claim 17, wherein determining whether a human is operating the capacitance module includes detecting a parameter indicated by the human-verification prompt.

20. A computer-program product for telling a human apart from a computer using a capacitance module, the computer-program product comprising a non-transitory computer-readable medium storing instructions executable by a processor to:
- receive a request for human verification;
- determine a human-verification prompt that distinguishes between a human and a computer;
- communicate the human-verification prompt using a prompting device in the capacitance module;
- detect a response to the human-verification prompt using a user input sensor in the capacitance module;
- determine whether a human is operating the capacitance module based, in part, on the response detected by the user input detector; and
- return a human verification result.

\* \* \* \* \*